US009984608B2

(12) United States Patent
Sacchetto et al.

(10) Patent No.: US 9,984,608 B2
(45) Date of Patent: May 29, 2018

(54) INVERSION BALANCING COMPENSATION

(71) Applicant: Apple Inc., Cupertino, CA (US)

(72) Inventors: Paolo Sacchetto, Cupertino, CA (US); Christopher P. Tann, San Jose, CA (US); Taesung Kim, Los Altos, CA (US); Sandro H. Pintz, Menlo Park, CA (US); Marc Albrecht, San Francisco, CA (US); Chaohao Wang, Sunnyvale, CA (US); David S. Zalatimo, San Jose, CA (US); Fenghua Zheng, San Jose, CA (US); Zhibing Ge, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 58 days.

(21) Appl. No.: 14/986,181

(22) Filed: Dec. 31, 2015

(65) Prior Publication Data

US 2016/0117971 A1 Apr. 28, 2016

Related U.S. Application Data

(63) Continuation-in-part of application No. 14/725,545, filed on May 29, 2015.

(Continued)

(51) Int. Cl.

*G09G 3/20* (2006.01)
*G09G 3/36* (2006.01)

(Continued)

(52) U.S. Cl.

CPC ....... *G09G 3/20* (2013.01); *G09G 2310/0254* (2013.01); *G09G 2310/063* (2013.01);

(Continued)

(58) Field of Classification Search

CPC combination set(s) only.
See application file for complete search history.

(56) References Cited

U.S. PATENT DOCUMENTS 6,507,330 B1 1/2003 Handschy et al.
7,391,398 B2 6/2008 Inoue (Continued)

FOREIGN PATENT DOCUMENTS

EP 2109094 A1 10/2009
JP 2003255306 A 9/2003

(Continued)

*Primary Examiner* — Wesner Sajous
(74) *Attorney, Agent, or Firm* — Fletcher Yoder PC

(57) ABSTRACT

System and method for improving displayed image quality of an electronic display that displays a first image frame by applying a first voltage to a display pixel and a second image frame directly before the first image frame by applying a second voltage to the display pixel. A display pipeline is communicatively coupled to the electronic display and receives first image data corresponding with the first image frame, where the image data includes a first grayscale value corresponding with the display pixel. Additionally the display pipeline determines an inversion balancing grayscale offset based at least in part on the first grayscale value when polarity of the first voltage and polarity of the second voltage are the same and determines magnitude of the first voltage by applying the inversion balancing grayscale offset to the first grayscale value to reduce likelihood of a perceivable luminance spike when displaying the first image frame.

27 Claims, 10 Drawing Sheets

Related U.S. Application Data

(60) Provisional application No. 62/017,081, filed on Jun. 25, 2014.

(51) Int. Cl.
*H04N 1/60* (2006.01)
*H04N 9/73* (2006.01)

(52) U.S. Cl.
CPC . *G09G 2310/08* (2013.01); *G09G 2320/0204* (2013.01); *G09G 2340/0435* (2013.01)

(56) References Cited

U.S. PATENT DOCUMENTS

| | | | | |
|---|---|---|---|---|
| 7,738,001 | B2 | 6/2010 | Routley et al. | |
| 7,755,649 | B2 | 7/2010 | Brown et al. | |
| 8,237,647 | B2 | 8/2012 | Hosaka | |
| 8,248,341 | B2 | 8/2012 | Neugebauer | |
| 8,605,138 | B2 | 12/2013 | Son et al. | |
| 8,624,936 | B2 | 1/2014 | Kimura | |
| 9,449,571 | B2 | 9/2016 | Takahashi et al. | |
| 2006/0125742 | A1* | 6/2006 | Sekiguchi | G09G 3/3406 345/80 |
| 2009/0115772 | A1* | 5/2009 | Shiomi | G09G 3/342 345/214 |
| 2010/0231830 | A1* | 9/2010 | Hirakata | G02B 1/105 349/85 |
| 2010/0265168 | A1 | 10/2010 | Neugebuer | |
| 2011/0221798 | A1 | 9/2011 | Cummings | |
| 2012/0162238 | A1 | 6/2012 | Fleck et al. | |
| 2013/0033479 | A1* | 2/2013 | Zebedee | G09G 3/3648 345/212 |
| 2013/0235020 | A1 | 9/2013 | Kim et al. | |
| 2014/0184583 | A1 | 7/2014 | Wyatt | |
| 2014/0204067 | A1* | 7/2014 | Gupta | G09G 3/3233 345/211 |
| 2015/0002381 | A1* | 1/2015 | Fujioka | G09G 3/3614 345/87 |
| 2015/0116373 | A1 | 4/2015 | Kim et al. | |
| 2015/0170598 | A1 | 6/2015 | Jeon et al. | |
| 2015/0194111 | A1 | 7/2015 | Slavenburg et al. | |
| 2015/0243233 | A1* | 8/2015 | Bloks | G09G 3/3614 345/96 |
| 2015/0243234 | A1 | 8/2015 | Bloks et al. | |
| 2015/0379918 | A1* | 12/2015 | Tann | G09G 3/2092 345/209 |
| 2016/0017159 | A1* | 1/2016 | Kaneko | C09D 11/037 522/39 |
| 2016/0063933 | A1* | 3/2016 | Kobayashi | G09G 3/3614 345/691 |
| 2016/0232833 | A1* | 8/2016 | Wang | G09G 3/2092 |
| 2016/0365049 | A1 | 12/2016 | Uemura et al. | |

FOREIGN PATENT DOCUMENTS

| | | | |
|---|---|---|---|
| KR | 10-2013-0121458 | A | 11/2013 |
| WO | WO2013125406 | A1 | 8/2013 |
| WO | 2014002607 | A1 | 1/2014 |

* cited by examiner

INVERSION BALANCING COMPENSATION

CROSS REFERENCE TO RELATED APPLICATIONS

This application is a continuation-in-part of U.S. patent application Ser. No. 14/725,545, entitled "Inversion Balance Compensation," filed May 29, 2015, which claims priority to U.S. Provisional Patent Application No. 62/017,081, entitled "Inversion Balance Compensation," filed Jun. 25, 2014, which are both herein incorporated by reference.

BACKGROUND

The present disclosure relates generally to electronic displays and, more particularly, to inversion balancing in electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, an electronic display may enable a user to perceive visual representations by successively writing image frames to display pixels of the electronic display. The electronic display may write an image frame, for example, by applying positive polarity voltage or negative polarity voltages, to produce electric field in the display pixels. In some instances, the electronic display may switch between applying positive voltages and negative voltages. For example, the electronic display may apply a positive voltage to a display pixel to display a first image frame and apply a negative voltage to the display pixel to display a second image frame.

As used herein, a "refresh rate" is intended to describe frequency with which image frames are written to the display pixels. Since power is consumed to apply voltage to the display pixels, refresh rate may affect power consumption of the electronic display. For example, reducing the refresh rate may reduce power consumption of the electronic display. On the other hand, increasing the refresh rate may increase power consumption of the electronic display. Thus, some electronic displays may dynamically adjust refresh rate used to display image frames to facilitate reducing power consumption.

However, different refresh rates may cause image frames to be displayed for different durations and, thus, voltages to be applied to the display pixels for different durations. In other words, in some instances, duration positive voltages and negative voltages are applied to a display pixel may vary, which may increase polarization of the display pixel. For example, when a first image frame is displayed at a 60 Hz refresh rate by applying a positive voltage to a display pixels and a second image frame is displayed at a 30 Hz refresh rate by applying a negative voltage to the display pixel, the negative voltage may be applied to the display pixel for twice as long as the positive voltage, which may polarize the display pixel negative. Since light emission is based on magnitude of the electric field, polarizing a display pixel may cause the display pixel to emit a different amount of light than expected, which may be perceivable as a visual artifact.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving displayed image quality of an electronic display. Generally, an electronic display may display an image frame by applying voltage to display pixels, thereby producing an electric field that control light emitted from the display pixels. In some embodiments, the electric field may be produced by applying a positive voltage or a negative voltage.

Duration each voltage polarity is applied may gradually polarize the display pixels. For example, applying a positive voltage may gradually polarize a display pixel positive and applying a negative voltage may gradually polarize the display pixel negative. As such, polarizing the display pixel may affect magnitude of the electric field and, thus, light emission from the display pixel. Thus, as magnitude of polarization increases, the variations in light emission may increase, thereby increasing likelihood of perceivable visual artifacts.

To reduce likelihood of perceivable visual artifacts, the electronic display may include a controller that determines polarization of the display pixels and polarity with which to display subsequent image frames based on polarization of the display pixels. In some embodiments, the controller may use a counter to track duration positive voltages and negative voltages are applied to each display pixel. For example, the controller may increment the counter the duration positive voltage is applied to a display pixel and decrement the counter the duration negative voltage is applied to the display pixel. In this manner, the controller may determine voltage polarities with which to display subsequent image frames to reduce polarization and, thus, likelihood of displaying perceivable visual artifacts.

In some instances, this may result in successive image frames being displayed by applying the same voltage polarities to the display pixels. For example, when polarized negative, the electronic display may successively display multiple image frames by applying positive voltage to a display pixel. However, displaying successive image frames using the same voltage polarities may result in a perceivable luminance spike in later displayed image frames.

Accordingly, in some embodiments, the controller may determine an inversion balancing grayscale offset to reduce likelihood of causing a perceivable luminance spike. In some embodiments, the controller may determine the inversion balancing grayscale offset based at least in part on grayscale value of image data corresponding with each image frame displayed successively using the same voltage polarities. For example, when a first image frame and a second image frame are successively displayed using the same voltage polarities, the controller may determine an inversion balancing grayscale offset based at least in part on both grayscale values of image data corresponding with the first image frame and grayscale values of image data corresponding with the second image frame. The inversion balancing grayscale offset value may then be applied to the image data corresponding with the second image frame, for example, to reduce magnitude of voltage applied to display the second image frame and, thus, likelihood of displaying a perceivable luminance spike.

In some embodiments, the controller may determine the inversion balancing grayscale offset using one or more pre-defined look-up-tables (LUTs). Since dependent on grayscale values of each successively displayed image frame, the look-up-tables may be multi-dimensional look-up-tables. In some embodiments, to reduce number and/or dimensions of the look-up-tables, the controller may only use the same voltage polarities to display successive image frame when the successive image frames are the same (e.g., have the same grayscale values). Since the grayscale values of the successively display image frames are the same, the number and dimension of the look-up-tables may be reduced.

BRIEF DESCRIPTION OF THE DRAWINGS

Various aspects of this disclosure may be better understood upon reading the following detailed description and upon reference to the drawings in which.

DETAILED DESCRIPTION

Figure 1:
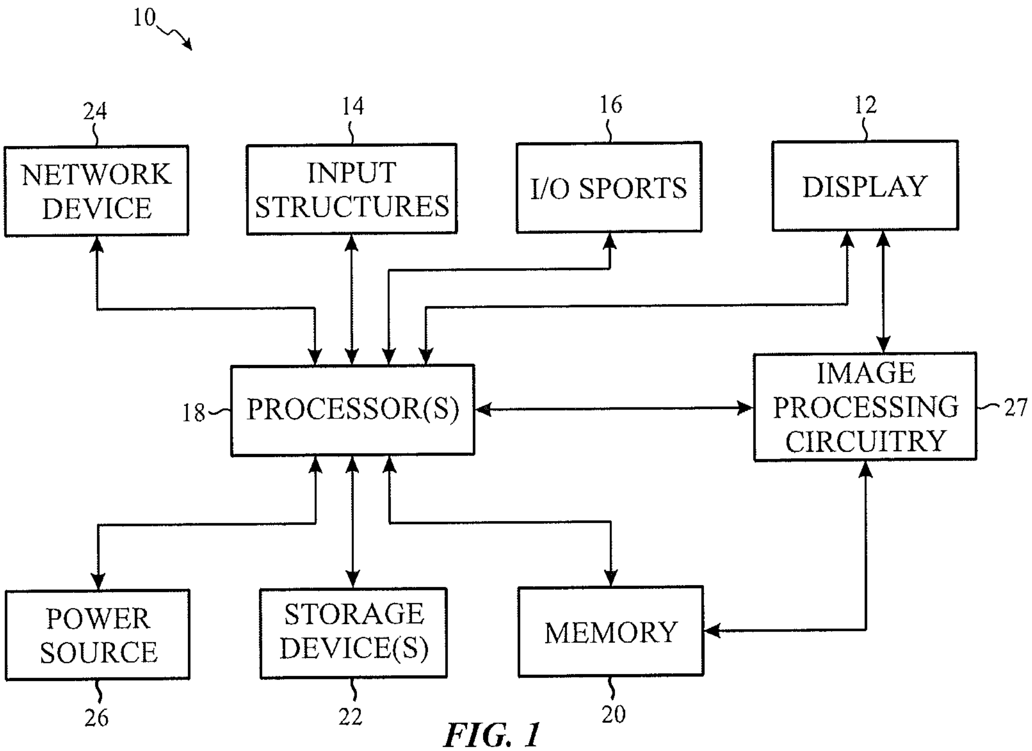
FIG. 1 is a block diagram of a computing device used to display image frames, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electronic display may display image frames when voltage is applied to display pixels. For example, a voltage may be applied to a pixel electrode in a display pixel, thereby creating a voltage difference and, thus, an electric field between the pixel electrode and a common electrode. The electric field may then control light emitted from the display pixel, for example, by adjusting orientation of liquid crystals in the electronic display. Since the electric field is generated by a voltage difference, an image frame may be displayed by applying either a positive polarity voltage or negative polarity voltage to the display pixel.

However, applying a voltage to a display pixel may gradually polarize the display pixel. For example, applying a positive voltage may gradually polarize the display pixel positive and applying a negative voltage may gradually polarize the display pixel negative. As such, polarizing the display pixel may affect magnitude of the electric field and, thus, light emission from the display pixel. For example, when polarized positive and a subsequent voltage is applied, the positive polarization may cause the pixel electrode to be more positive than the applied voltage and, thus, affect magnitude of the generated electric field and light emission from the display pixel.

Since a human's eyes generally average areas of multiple display pixels when perceiving an image frame, small amounts of polarization may be unperceivable and, thus, acceptable. However, the likelihood of perception may increase as magnitude of polarization increases. When a constant refresh rate is used to display successive image frames, it may be possible to maintain polarization below a perceivable threshold by alternating between application of positive voltages and negative voltages. For example, the electronic display may display a first image by applying a positive voltage to a display pixel and display a second image frame by applying a negative voltage to the display pixels. In this manner, the positive voltage and the negative voltage may be applied to the display pixel for approximately the same duration, thereby canceling out and not further polarizing the display pixel.

However, in some embodiments, an electronic display may dynamically adjust refresh rate used to display image frames, for example, to facilitate reducing power consumption. For example, the electronic display may display a first image frame with a 60 Hz refresh rate and a second image frame with a 30 Hz refresh rate. Thus, in such embodiments, the duration that each image frame is displayed may vary. For example, the second image frame may be displayed twice as long as the first image frame.

In such embodiments, even alternating the polarity of the voltage applied to the display pixels may still result in polarization. For example, in an extreme case, each odd image frame may be displayed at a 60 Hz refresh rate by applying a positive voltage to a display pixel and each even number frame may be displayed at a 30 Hz refresh rate by applying a negative voltage to the display pixel. In such a case, negative polarity voltages are applied to the display pixel for twice as long as positive polarity voltages, thereby polarizing the display pixel more and more negative over time. If such a pattern continues over an extended duration, the display pixel may be polarized to a point that causes variation in light emission to be perceivable as a visual artifact.

Accordingly, as will be described in more detail below, embodiments of the present disclosure provide techniques to improve displayed image quality of an electronic display, for example, by reducing likelihood of displaying perceivable visual artifacts even when the electronic display uses a dynamic refresh rate. To facilitate, the electronic display may include a controller that determines polarization of display pixels and controls polarity of voltages applied to the display pixel to display subsequent image frames. In some embodiments, the controller may utilize a counter to track duration positive voltages and negative voltages are applied to each display pixel and, thus, polarization. For example, the controller may increment the counter when an image frame is displayed by applying a positive polarity to a display pixel and decrement the counter when an image frame is displayed by applying a negative polarity to the display pixel. In such instances, the controller may determine that the display pixel is polarized positive when the counter value is positive and that the display pixel is polarized negative when the counter value is negative.

In this manner, based at least in part on the counter value the controller may determine current polarization of the display pixels and voltage polarity with which to display the image frame. For example, when the counter value is negative, the controller may determine that a positive voltage should be applied to a display pixel to display a subsequent image frame to reduce polarization of the display pixel. On the other hand, when the counter value is negative, the controller may determine that a negative voltage should be applied to the display pixel to display the subsequent image frame to reduce polarization of the display pixel.

Based on the image data, the controller may also determine duration the corresponding image frame is expected to be displayed. In some embodiments, the controller determines the expected display duration based on number of lines (e.g., active lines and vertical blank lines) included in the corresponding image data. To facilitate tracking polarization of the display pixels, the controller may update (e.g., increment or decrement) the counter based on the expected display duration of the image frame and voltage polarity used to display the image frame. For example, when a first image frame is displayed with a 30 Hz refresh rate by applying a positive voltage, the controller may increment the counter value to indicate that a subsequent 60 Hz image frame should be displayed by applying a negative voltage. Additionally, the counter value may indicate that a second subsequent 60 Hz image frame should also be displayed by applying a negative voltage.

Thus, in some instances, successive images frames may be displayed by applying the same voltage polarities. However, in some instances, displaying successive image frames by applying the same voltage polarities may cause a perceivable luminance spike in the later displayed image frame. In other words, continuing with the above example, the second subsequent 60 Hz image frame may contain a perceivable luminance spike when displayed.

Accordingly, in some embodiments, an inversion balancing grayscale offset may be applied to reduce likelihood of causing perceivable luminance spikes when using the same voltage polarities to display successive image frames. In some embodiments, the controller may determine the inversion balancing grayscale offset based at least in part on grayscale value of image data corresponding with each image frame displayed successively using the same voltage polarities. For example, when a first image frame and a second image frame are successively displayed using the same voltage polarities, the controller may determine an inversion balancing grayscale offset based at least in part on both grayscale values of image data corresponding with the first image frame and grayscale values of image data corresponding with the second image frame. The inversion balancing grayscale offset value may then be applied to the image data corresponding with the second image frame, for example, to reduce magnitude of voltage applied to display the second image frame and, thus, likelihood of displaying a perceivable luminance spike.

In some embodiments, the controller may determine the inversion balancing grayscale offset using one or more pre-defined look-up-tables (LUTs). Since dependent on grayscale values of each successively displayed image frame, the look-up-tables may be multi-dimensional look-up-tables. For example, when a first image frame and a second image frame are successively displayed using the same voltage polarities, the controller may use a two dimensional look-up-table to determine a first inversion balancing grayscale offset to apply to the grayscale values of the second image frame. Additionally, when a third image frame is successively display after the second image frame using the same voltage polarities, the controller may use a three dimensional look-up-table to determine a second inversion balancing grayscale offset to apply to the grayscale values of the third image frame.

However, this may lead to the use of a large number of multi-dimensional look-up-tables, which consumes storage space. For example, when grayscale values range from 0-255, the controller may already use up to 65,536 different two-dimensional look-up-tables to determine an inversion balancing grayscale offset. In some embodiments, the controller may facilitate reducing number of look-up-tables by interpolating between fewer look-up-tables to determine an inversion balancing grayscale offset. However, the number of look-up-tables may increase even further when three or more image frames are successively displayed using the same voltage polarities.

Thus, in some embodiments, the controller may only use the same voltage polarities to display successive image frame when the successive image frames are the same (e.g., have the same grayscale values). Additionally, the controller may only repeat the same voltage polarities twice when displaying successive image frames. Since the grayscale values of the successively display image frames are the same, the look-up-tables may be one-dimensional look-up-tables and the number of look-up-tables may be decreased. For example, when grayscale values range from 0-255 and successively displayed image frames are the same, the controller may use less than or equal to 256 one-dimensional look-up-tables to determine an inversion balancing grayscale value.

To help illustrate, a computing (e.g., electronic) device 10 that may utilize an electronic display 12 to display image frames based on image data is described in FIG. 1. As will be described in more detail below, the computing device 10 may be any suitable computing device, such as a handheld computing device, a tablet computing device, a notebook computer, and the like. Thus, it should be noted that FIG. 1 is merely one example of a particular implementation and is intended to illustrate the types of components that may be present in the computing device 10.

In the depicted embodiment, the computing device 10 includes the electronic display 12, input structures 14, input/output (I/O) ports 16, a processor core complex 18 having one or more processor(s) or processor cores, local memory 20, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally, the image processing circuitry 27 (e.g., a graphics processing unit) may be included in the processor core complex 18.

As depicted, the processor core complex 18 is operably coupled with local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more general purpose microprocessors, one or more application specific processors (ASICs), one or more field programmable logic arrays (FPGAs), or any combination thereof.

The local memory 20 and/or the main memory storage device 22 may be tangible, non-transitory, computer-readable mediums that store instructions executable by and data to be processed by the processor core complex 18. For example, the local memory 20 may include random access memory (RAM) and the main memory storage device 22 may include read only memory (ROM), rewritable non-volatile memory such as flash memory, hard drives, optical discs, and the like. By way of example, a computer program product containing the instructions may include an operating system or an application program.

Additionally, as depicted, the processor core complex 18 is operably coupled with the network interface 24. Using the network interface 24, the computing device 10 may communicatively couple to a network and/or other computing devices. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the computing device 10 to transmit encoded image data to a network and/or receive encoded image data from the network for display on the electronic display 12.

Furthermore, as depicted, the processor core complex 18 is also operably coupled to the power source 26, which may provide power to the various components in the computing device 10. The power source 26 may include any suitable source of energy, such as a rechargeable lithium polymer (Li-poly) battery and/or an alternating current (AC) power converter.

Additionally, as depicted, the processor core complex 18 is operably coupled with I/O ports 16, which may enable the computing device 10 to interface with various other electronic devices, and input structures 14, which may enable a user to interact with the computing device 10. The inputs structures 14 may include buttons, keyboards, mice, trackpads, and the like. Additionally or alternatively, the electronic display 12 may include touch components that enable user inputs to the computing device 10 by detecting occurrence and/or position of an object touching its screen (e.g., surface of the electronic display 12).

In addition to enabling user inputs, the electronic display 12 may present visual representations of information, such as a graphical user interface (GUI) of an operating system, an application interface, a still image, or video content, by display image frames. As described above, the electronic display 12 may display the image frames based on image data. In some embodiments, the image data may be received from other computing devices 10, for example, via the network interface 24 and/or the I/O ports 16. Additionally or alternatively, the image data may be generated by the processor core complex 18 and/or the image processing circuitry 27.

Figure 2:
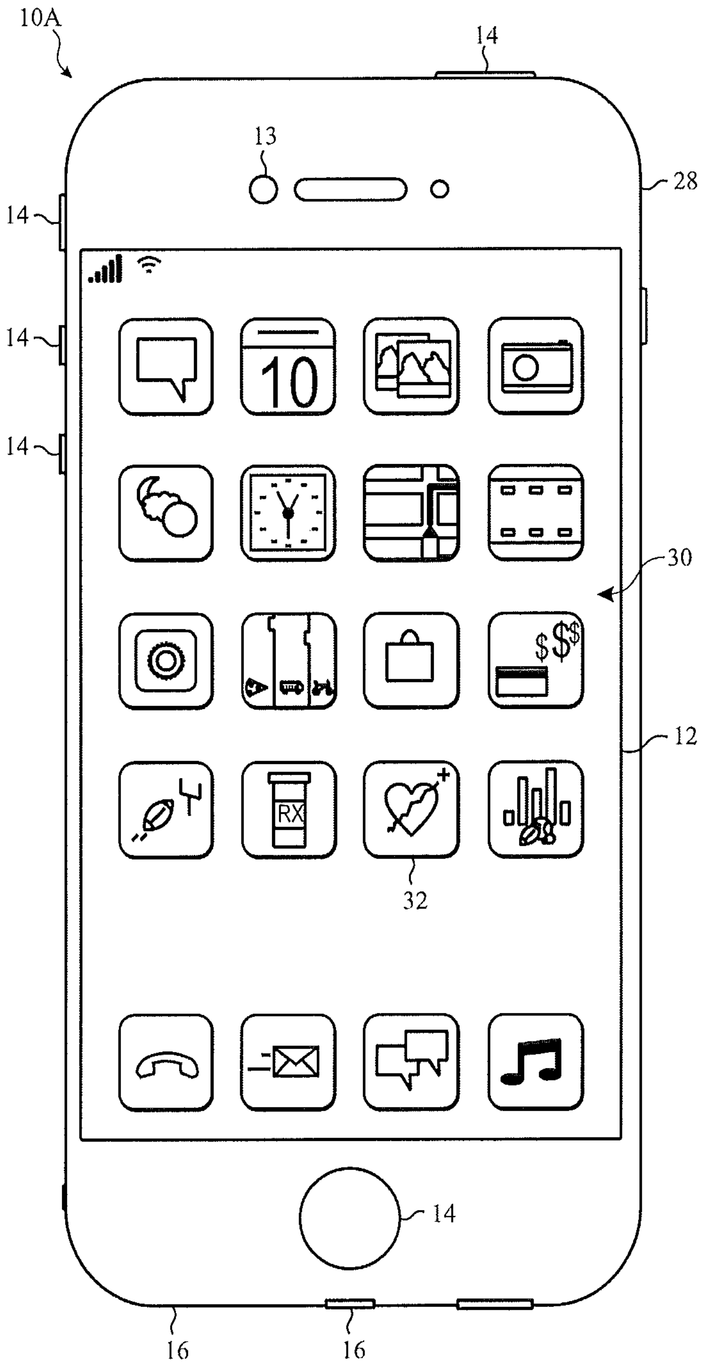
FIG. 2 is an example of the computing device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and/or shields them from electromagnetic interference. The enclosure 28 may surround the electronic display 12, which, in the depicted embodiment, displays a graphical user interface (GUI) 30 having an array of icons 32. By way of example, when an icon 32 is selected either by an input structure 14 or a touch component of the electronic display 12, an application program may launch.

Additionally, as depicted, input structures 14 open through the enclosure 28. As described above, the input structures 14 may enable user interaction with the handheld device 10A. For example, the input structures 14 may activate or deactivate the handheld device 10A, navigate a user interface to a home screen, navigate a user interface to a user-configurable application screen, activate a voice-recognition feature, provide volume control, and/or toggle between vibrate and ring modes. As depicted, I/O ports 16 also open through the enclosure 28. In some embodiments, the I/O ports 16 may include an audio jack to connect to external devices. Furthermore, as depicted, the image sensor 13 opens through the enclosure 28. In some embodiments, the image sensor 13 may include a digital camera that captures image data.

Figure 3:
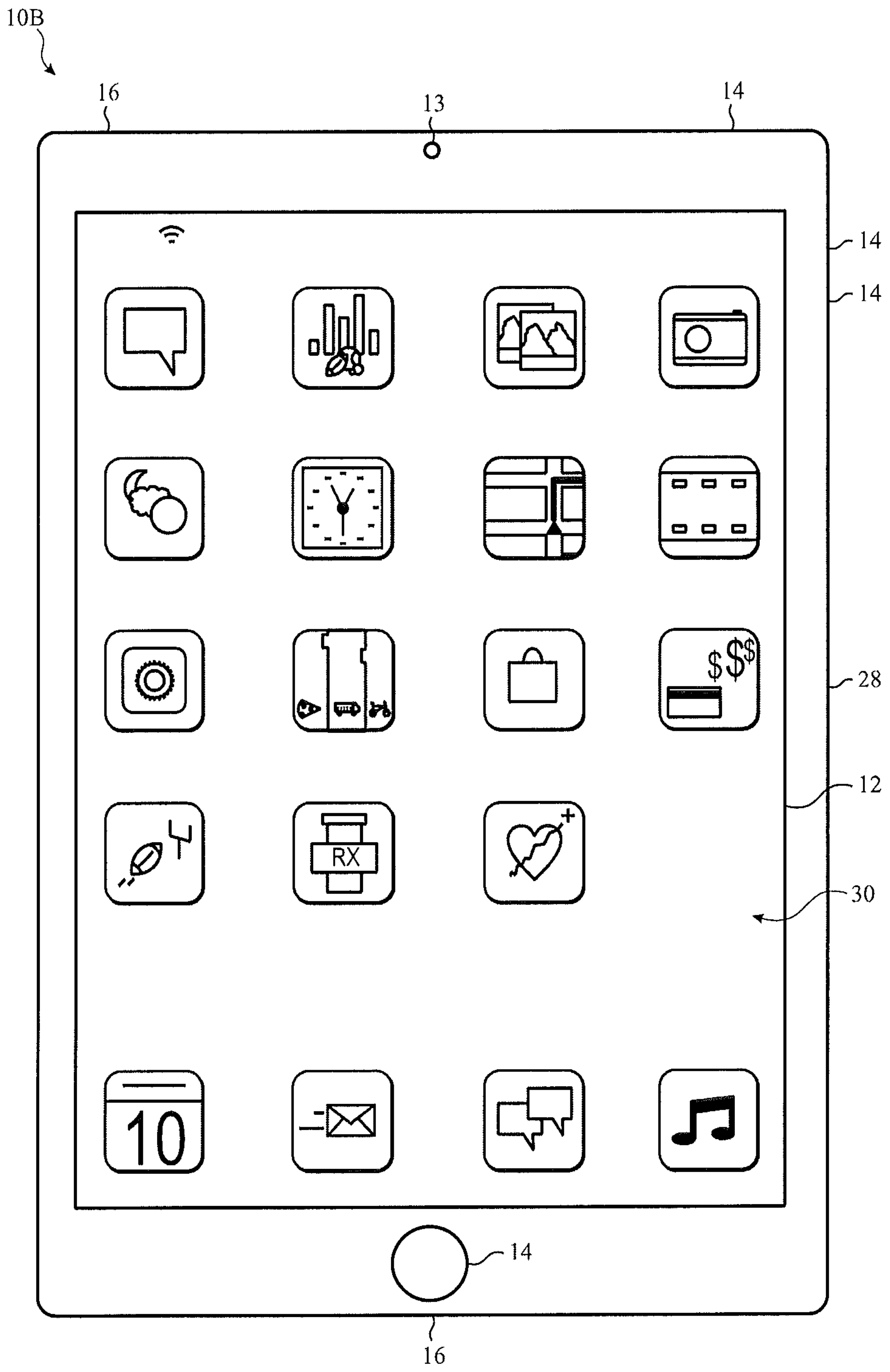
FIG. 3 is an example of the computing device of FIG. 1, in accordance with an embodiment.
Figure 4:
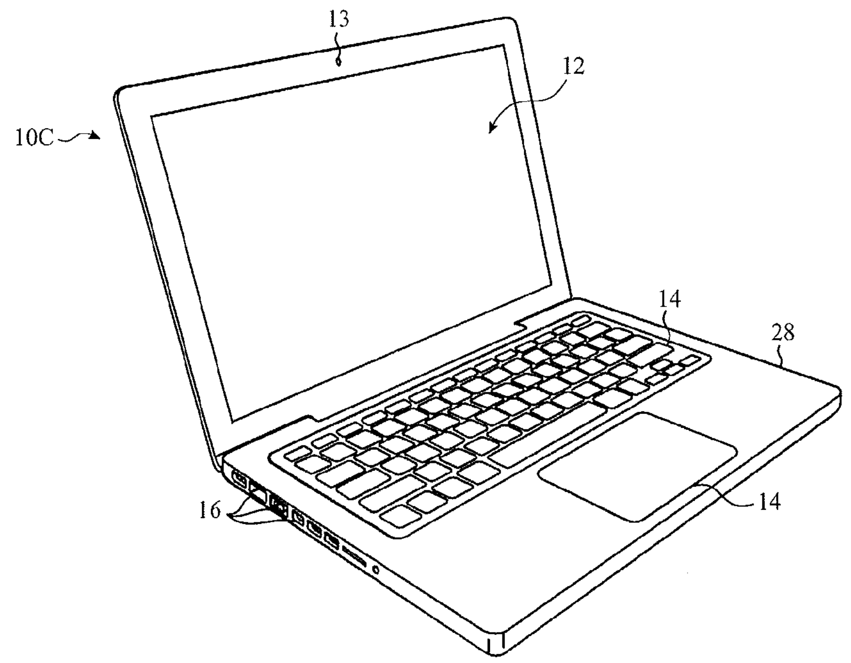
FIG. 4 is an example of the computing device of FIG. 1, in accordance with an embodiment.

To further illustrate a suitable computing device 10, a tablet device 10B is described in FIG. 3. For example, the tablet device 10B may be any iPad® model available from Apple Inc. Additionally, in other embodiments, the computing device 10 may take the form of a computer 10C as described in FIG. 4. For example, the computer 10C may be any Macbook® or iMac® model available from Apple Inc. As depicted, the tablet device 10B and the computer 10C may each also include an electronic display 12, input structures 14, I/O ports 16, an enclosure 28, or any combination thereof.

As described above, the electronic display 12 may display image frames based on image data received, for example, from the processor core complex 18 and/or the image processing circuitry 27. In some embodiments, the image data may be processed by a display pipeline before being used to display image frames. For example, display pipeline may gamma correct the image data by applying a pixel response correction grayscale offset to the image data. Additionally, the display pipeline may apply an inversion balancing grayscale offset to the image data to reduce likelihood of successively image frames displayed using the same voltage polarities containing a perceivable luminance spike.

Figure 5:
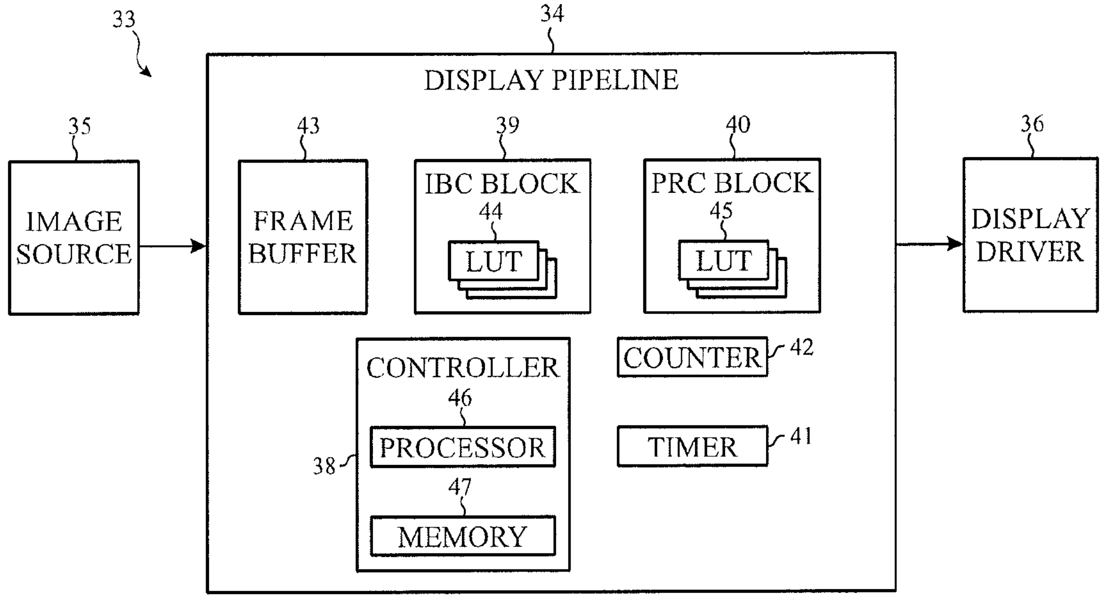
FIG. 5 is block diagram of a portion of the computing device of FIG. 1 used to display image frames, in accordance with an embodiment.

To help illustrate, a portion 33 of the computing device 10 including a display pipeline 34 is described in FIG. 5. As depicted, the display pipeline 34 is communicatively coupled between an image source 35 and a display driver 36 of the electronic display 12. In the depicted embodiment, the image source 35 may communicate image data to the display pipeline 34 for processing. Accordingly, in some embodiments, the image source 35 may be the processor core complex 18 and/or the image processing circuitry 27. Additionally, in the depicted embodiment, the display pipeline 34 may output processed image data to the display driver 36 for display. In some embodiments, the display driver 36 may display image frames on the electronic display 12 by applying voltage to display pixels.

To facilitate processing the image data, the display pipeline 34 may include a controller 38, an inversion balancing compensation (IBC) block 39, a pixel response correction (PRC) block 40, a timer 41, a counter 42 and, in some embodiments, a frame buffer 43. In some embodiments, the controller 38 may substantially control operation of the display pipeline 34, the image source 35, and/or the display driver 36. For example, the controller 38 may instruct the image source 35 to communicate image data to the display pipeline 34 and the display driver 36 to display image frames on the electronic display 12 by applying voltage to display pixels. Additionally, the controller 38 may instruct the display pipeline 34 to analyze image data received from the image source 35, for example, to determine expected display duration and/or refresh rate with which to display a corresponding image frame.

Furthermore, the controller 38 may instruct the display pipeline 34 to process image data received from the image source 35 by determining a grayscale offset. For example, the controller 38 may instruct the display pipeline 34 to determine a pixel response grayscale offset and apply the pixel response grayscale offset to gamma correct the image data. In some embodiments, the display pipeline 34 may determine the pixel response grayscale offset using one or more inversion balancing compensation look-up-tables 44 in the inversion balancing compensation block 39. Additionally, the controller 38 may instruct the display pipeline 34 to determine an inversion balancing grayscale offset and apply to the inversion balancing grayscale offset to the image data to reduce likelihood of displaying a perceivable luminance spike. In some embodiments, the display pipeline 34 may determine the inversion balancing grayscale offset using one or more pixel response correction look-up-tables 45 in the pixel response correction block 40.

As described above, the inversion balancing grayscale offset may be based on grayscale value of image data corresponding with image frames successively displayed using the same voltage polarities. Accordingly, in some embodiments, the frame buffer 43 may store image data received from the image source 35 to facilitate determining the inversion balancing grayscale offset. However, the frame buffer 43 may utilize memory space and/or physical space within the computing device 10. Thus, in some embodiments, the display pipeline 34 may determine the inversion balancing grayscale offset even without the use of the frame buffer. For example, in such embodiments, the display pipeline 34 may determine that successively display image frames should only be written using the same voltage polarities when they are the same (e.g., have the same grayscale values), thereby obviating storage of previous image data and, thus, the frame buffer 43

To facilitate controlling operation, the controller 38 may include controller processor 46 and controller memory 47. In some embodiments, the controller processor 46 may execute instructions stored in the controller memory 47. Thus, in some embodiments, the controller processor 46 may be included in the processor core complex 18 and/or the image processing circuitry 27. In other embodiments, the controller processor 46 may included in a timing controller in the electronic display 12 and/or a separate processing module. Additionally, in some embodiments, the controller memory 47 may be included in local memory 20, main memory storage device 22, or another tangible, non-transitory, computer readable medium.

As described above, in operation, the display pipeline 34 may analyze image data received from the image source 35. Specifically, the display pipeline 34 may analyze the received image data to determine magnitude of voltage to apply to each display pixel to display a corresponding image frame. Additionally, the display pipeline 34 may analyze the received image data to determine expected display duration and, thus, refresh rate used to display the corresponding image frame.

In some embodiments, the display pipeline 34 may the refresh rate based at least in part on the number of lines (e.g., vertical blank (Vblank) lines and/or active lines) included in the image data. As used herein, a line (e.g., active or vertical blank) is used to describe the amount of time to write to one row of pixels. Since each row of pixels in the display panel is successively written, the duration an image is displayed includes the number of active lines in corresponding image data. Additionally, when a vertical blank line in the corresponding image data is received, the displayed image may continue to be displayed. As such, the total duration an image is displayed may be described as the sum of the number of vertical blank lines and the number of active lines in the corresponding image data.

For example, when the electronic display 12 displays images with a resolution of 2880×1800 and received image data includes 52 vertical blank lines and 1800 active lines, the display pipeline 34 may determine that a corresponding first image frame has an expected display duration of 1852 lines. Based on the expected display duration, the display pipeline 34 may determine that the first image frame should be display with a 60 Hz refresh rate and instruct the display driver 36 accordingly. Additionally, when the electronic display 12 displays images with a resolution of 2880×1800 and received image data includes 1904 vertical blank lines and 1800 active lines, the display pipeline 34 may determine that a corresponding second image frame has an expected duration of 3704 lines. Based on the expected display duration, the display pipeline may determine that the first image frame should be display with a 30 Hz refresh rate and instruct the display driver 36 accordingly.

As described above, applying a positive voltage or a negative voltage may gradually polarize a display pixel. Thus, the duration positive and negative voltages are applied to the display pixels may be used to determine polarity of the voltage used to display subsequent image frames. In some embodiments, the display pipeline 34 may utilize the counter 42 to keep track of the durations. For example, in some embodiments, the counter 42 may count up when a positive voltage is applied and count down when a negative voltage applied.

In such embodiments, the display pipeline 34 may determine voltage polarity used to display a next subsequent image frame based at least in part on the counter value. For example, the display pipeline 34 may determine that the next subsequent image frame should be displayed with a negative voltage when the counter value is positive and instruct the display driver 36 accordingly. On the other hand, the display pipeline 34 may determine that the next subsequent image frame should be displayed with a positive voltage when the counter value is negative and instruct the display driver accordingly. Thus, in some embodiments, the counter 42 may be sized such that the maximum positive and negative value is equal to the total number of lines in an image (e.g., frame). For example, the counter 42 may be 24 bits signed to accommodate refresh rates below 0.2 Hz. In this manner, the display pipeline 34 may reduce amount of polarization by applying positive voltages and negative voltages for approximately equal amounts of time.

As described above, when the image source 35 is transmitting image data (e.g., in active mode), the display pipeline 34 may determine expected display duration and, thus, refresh rate used to display an image frame based at least in part on number of vertical blank lines and/or active lines included in corresponding image data. However, in some embodiments, the image source 35 may utilize Advanced Link Power Management (ALPM) to further reduce power consumption. In such embodiments, the image source 35 may enter a sleep mode when the image source 35 determines that an image frame is the same as the directly previously image frame.

When the image source 35 stops transmitting image data, the voltage applied to display the directly previous image frame continues to be held in the display pixels. In other words, the voltage continues to be applied to the display pixels when new image frames are not being written. As such, the display pipeline 34 may use the timer 41 to account for the duration the voltage is being held by the display pixels. In some embodiments, the display pipeline 34 may start the timer 41 when the image source 35 stops transmitting image data and stop the timer when the image source 35 resumes transmitting image data.

Since the time used to write a line is generally constant, the display pipeline 34 may determine duration an image frame continues to be displayed after the image source 35 stops transmitting image data by dividing the timer value by the time generally used to write a line to a row of display pixels. In some embodiments, the time used to write a line may be predetermined and stored in the timing controller memory 44. In this manner, the display pipeline 34 may continue incrementing or decrementing the counter 42 to track duration positive voltages and negative voltages have been applied to the display pixels. As described above, the display pipeline 34 may determine then determine voltage polarities to use to display subsequent image frames based at least in part on the counter value and instruct the display driver 36 accordingly.

Figure 6:
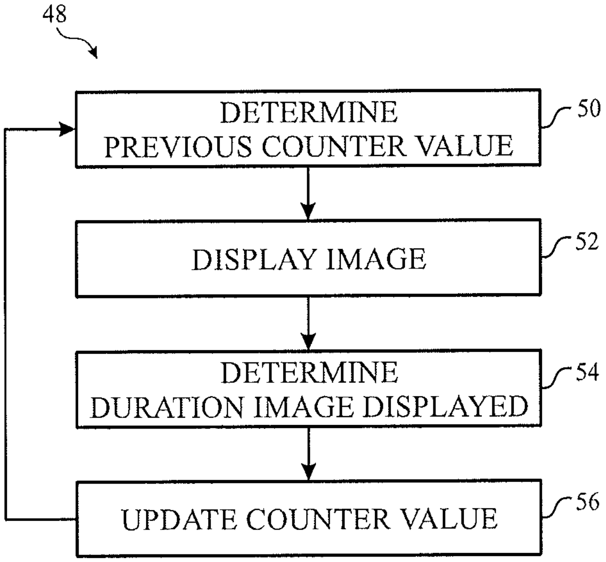
FIG. 6 is a flow diagram of a process for tracking polarization of display pixels, in accordance with an embodiment.

To help illustrate, one embodiment of a process 48 for displaying images is described in FIG. 6. Generally, the process 48 includes determining a previous counter value (process block 50), displaying an image frame (process block 52), determining duration the image frame is displayed (process block 54), and updating the counter value (process block 56). In some embodiments, the process 48 may be implemented using instructions stored in a tangible, non-transitory, computer-readable medium, such as the controller memory 47, executable by processing circuitry, such as the controller processor 46.

Accordingly, in some embodiments, the controller 38 may instruct the display pipeline 34 to determine the previous counter value by polling the counter 42 (process block 50). In some embodiments, the display pipeline 34 may poll the counter 42 whenever image data is received from the image source 35. As described above, the previous counter value may indicate duration positive voltages and negative voltage have been applied to the display pixel and, thus, be used to determine voltage polarities to use to display subsequent image frames.

Thus, the controller 38 may instruct the display driver 36 to write an image frame to display pixels based at least in part on the received image data and the previous counter value (process block 52). As described above, the display driver 36 may write an image frame by applying a voltage to each of the display pixels. In some embodiments, the display pipeline may determine magnitude of voltages based at least in part on grayscale values described in the active lines of received image data. Additionally, as described above, the display pipeline 34 may process the received image data before display. For example, the display pipeline 34 may use the pixel response correction (PRC) block 40 to determine and apply a pixel response grayscale offset to the image data, thereby adjusting the grayscale values to gamma correct for non-linear properties of the human eye. Additionally, the display pipeline 34 may use the inversion balancing compensation (IBC) block 39 to determine and apply an inversion balancing grayscale offset to the image data, thereby adjusting the grayscale values to reduce likelihood of image frames successively displayed using the same voltage polarities containing a perceivable luminance spike.

Figure 7:
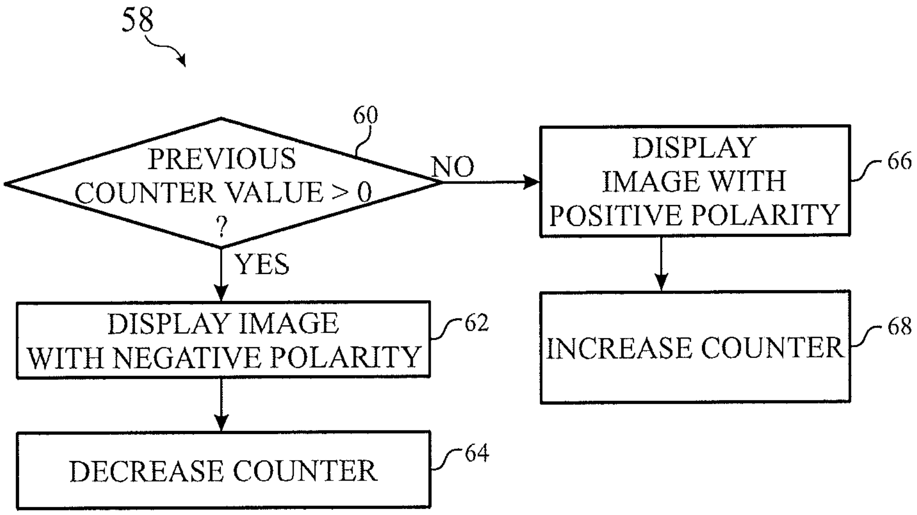
FIG. 7 is a flow diagram of a process for displaying an image frame based on a counter value, in accordance with an embodiment.

Additionally, the display pipeline 34 may determine the polarity of the voltages applied to each of the display pixels based on the previous counter value. To help illustrate, one embodiment of a process 58 for determining polarity of the voltages to apply is described in FIG. 7. Generally, the process 58 includes determining whether the previous counter value is greater than zero (decision block 60) and when the counter value is greater than zero, displaying an image frame by applying a negative voltage to a display pixel (process block 62) and decreasing the counter value (process block 64). On the other hand, when the counter value is not greater than zero (e.g., less than or equal to zero), the process 58 includes displaying the image frame by applying a positive voltage to a display pixel (process block 66) and increasing the counter value (process block 68). In some embodiments, the process 58 may be implemented using instructions stored in a tangible, non-transitory, computer-readable medium, such as the controller memory 47, executable by processing circuitry, such as the controller processor 46.

Accordingly, in some embodiments, the controller 38 may instruct the display pipeline 34 to determine whether the previous counter value is greater than zero (decision block 60). When the previous counter value is greater than zero, the display pipeline 34 may determine that the image frame should be displayed by applying a negative voltage at the determined magnitude to a display pixel (process block 62). On the other hand, when the previous counter value is not greater than zero, the display pipeline 34 may determine that the image frame should be display by applying a positive polarity voltage at the determined magnitude to the display pixel (process block 66).

Returning to the process 48 described in FIG. 6, the controller 38 may instruct the display pipeline 34 to determine duration the image frame is displayed (process block 56). As described above, when the image source 35 is active (e.g., transmitting image data), the display pipeline 34 may determine the duration the image frame is displayed based at least in part on number of lines (e.g., active lines and/or vertical blank lines) included in corresponding image data. On the other hand, when the image source 35 is asleep (e.g., not transmitting image data), the display pipeline 34 may determine the duration the image frame is displayed using the timer 41 to track duration the image source 35 is asleep.

Figure 8:
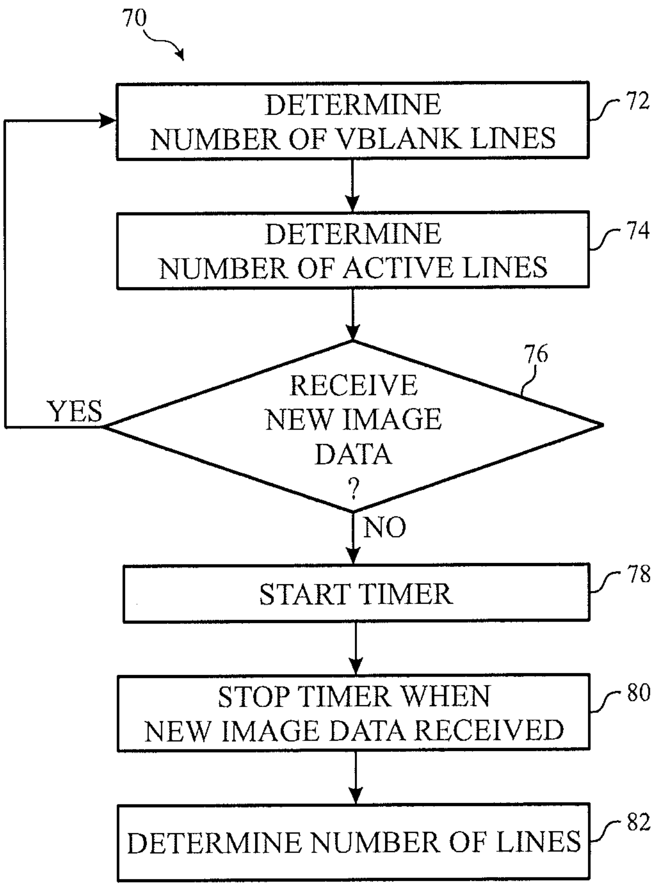
FIG. 8 is a flow diagram of a process for updating the counter value, in accordance with an embodiment.

To help illustrate, one embodiment of a process 70 for determining duration an image frame is displayed is described in FIG. 8. Generally, the process 70 includes determining the number of active lines included in the image data (process block 72), determining the number of vertical blank (Vblank) lines included in the image data (process block 74), and determining whether new image data is received (decision block 76). When new image data is received, the number of vertical blank lines and active lines may again be determined based on the new image data. On the other hand, when new image data is not received, the process 70 includes starting a timer (process block 78), stopping the timer when new image data is received (process block 80), and determining the number of lines the timer was running for (process block 82). In some embodiments, the process 70 may be implemented using instructions stored in a tangible, non-transitory, computer-readable medium, such as the controller memory 47, executable by processing circuitry, such as the controller processor 46.

Accordingly, in some embodiments, the controller 38 may instruct the display pipeline 34 to determine number of active lines included in image data received from the image source 35 (process block 72). Generally, the image data includes one active line for each row of display pixels in the electronic display 12. As such, the number of active rows in image data corresponding with an image is generally equivalent to the height of the resolution of the electronic display 12. For example, when electronic display 12 has a resolution of 2880×1800, the image data may include 1800 active lines. Accordingly, in some embodiments, the display pipeline 34 may count the number of active lines included in the image data. Additionally or alternatively, the number of active lines may be predetermined and stored in the controller memory 47.

Additionally, the controller 38 may instruct the display pipeline 34 to determine the number of vertical blank lines included in the image data received from the image source 35 (process block 74). In some embodiments, the vertical blank lines may include a vertical front porch, a vertical sync pulse, and a vertical back porch. More specifically, the vertical front porch may include a number of blank (e.g., black) lines that are transmitted before the vertical sync pulse, which may also last for several lines. After the vertical sync pulse, the vertical back porch may transmitted, which also includes a number of blank (e.g., black) lines. Thus, the display pipeline 34 may determine the number of vertical blank lines by counting the number of blank lines and the number of lines in the vertical sync pulse in the received image data.

In this manner, when the image source 35 is active (e.g., transmitting image data), the display pipeline 34 may determine the duration the image frame is displayed by adding together the number of vertical blank lines and the number of active lines received from the image source 35. However, in some embodiments, the image source 35 may cease transmission of image data, for example, when a subsequent image is the same as a previous image, to further reduce power consumption. Thus, the controller 38 may instruct the display pipeline 34 to determine whether new image data is received from the image source 35 (decision block 76). As described above, when the image source 35 ceases transmission of the image data, the electronic display 12 may continues to holding the voltage in the display pixels.

Accordingly, when new image data is not received, the controller 38 may determine that the image source 35 is asleep and instruct the display pipeline 34 to start the timer 41 (process block 78). When new image data is then subsequently received, the controller 38 determine that the image source 35 is no longer asleep and instruct the display pipeline 34 to stop the timer (process block 80). In this manner, the timer 41 may determine duration an image frame is displayed and, thus, duration voltages continue to be applied to the display pixels while the image source 35 is asleep.

Since the duration to write a line is generally constant, the controller 38 may instruct the display pipeline 34 to convert value of the timer 41 into an equivalent number of lines (process block 82). In some embodiments, the display pipeline 34 may determine the equivalent number of lines by dividing value of the timer 41 by time used to write one row (e.g., line) of an image frame. For example, if it takes one millisecond to write a row of an image frame and the timer 41 that the image source 35 is asleep for five milliseconds, the display pipeline 34 may determine that voltage was held by the pixels for an equivalent of five lines. Additionally or alternatively, the counter 42 may simply increment or decrement after each time duration for writing one line passes.

Returning to the process 48 described in FIG. 6, the controller 38 may instruct the display pipeline 34 to update value of the counter 42 based on duration and voltage polarities used to display the image frame (process block 56). In some embodiments, the display pipeline 34 may increment the counter 42 based on duration positive voltages are applied to a display pixel and decrement the counter 42 based on duration negative voltage are applied to the display pixel. As described above, the updated value of the counter 42 may then be used to determine voltage polarity with which to display a next subsequent image frame. In this manner, the amount of polarization of the display pixels may be reduced, thereby reducing likelihood of perceivable visual artifacts, by balancing duration positive and negative voltages are applied to each display pixel.

Figure 9:
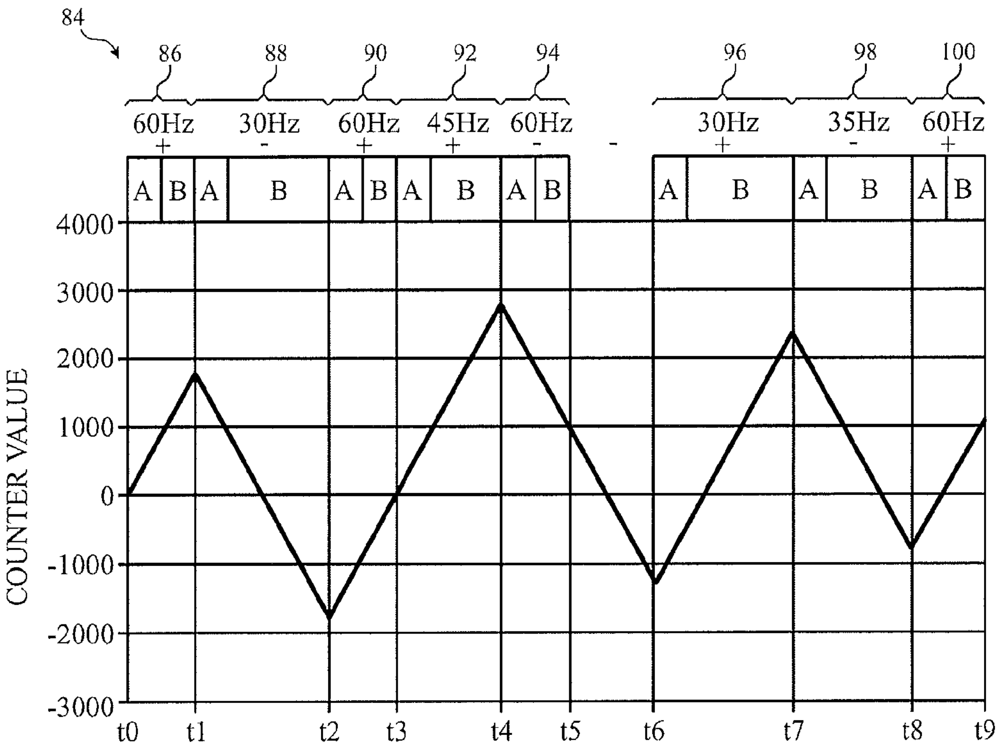
FIG. 9 is an example of a counter value in relation to a hypothetical operation of an electronic display, in accordance with an embodiment.

To help illustrate, a hypothetical display operation 84 is described in FIG. 9. In the depicted embodiment, image data received by the display pipeline 34 and corresponding value of the counter 42 between t0 and t9 are described.

As depicted, the display pipeline 34 begins to receive first image data 86 at t0. To display a first image frame corresponding with the first image data 86, the display pipeline 34 may analyze the first image data 86 to determine magnitude of the voltages to apply to each of the display pixels. As described above, the display pipeline 34 may determine the magnitude of the voltages based at least in part on the active lines of the first image data 86. Additionally, in response to receiving the first image data 86, the display pipeline 34 may poll the counter 42 and determine that the previous counter value is zero. Based on the previous counter value, the display pipeline 34 may determine that the first image frame should be displayed by applying a positive voltage to a display pixel. Furthermore, the display pipeline 34 may determine the expected display duration and, thus, refresh rate of the first image frame based on the total number of lines (e.g., vertical blank and active) included in the first image data 86. For example, the display pipeline 34 may determine that the first image data 86 includes 52 vertical blank lines and 1800 active lines (e.g., 1852 total lines) and, thus, the first image frame should be displayed with a 60 Hz refresh rate.

Accordingly, to display the first image frame, the display pipeline 34 may instruct the display driver 36 to apply a positive voltage to the display pixel at the determined magnitude with a refresh rate of 60 Hz. Additionally, since a positive voltage is applied, the display pipeline 34 may increment the counter 42. Thus, at t1, the counter value may be 1852.

As depicted, the display pipeline 34 begins to receive second image data 88 at t1. To display a second image frame corresponding with the second image data 88, the display pipeline 34 may determine the magnitude of the voltage to apply based on the active lines included in the second image data 88. Additionally, in response to receiving the second image data 88, the display pipeline 34 may poll the counter 42 and determine that the previous counter value is 1852. Based on the previous counter value, the display pipeline 34 may determine that the second image frame should be displayed by applying a negative voltage to the display pixel. Furthermore, the display pipeline 34 may determine that second image data 88 includes 1904 vertical blank lines and 1800 active lines (e.g., 3704 total lines) and, thus, the second image frame should be displayed with a refresh rate of 30 Hz.

Accordingly, to display the second image frame, the display pipeline 34 may instruct the display driver 36 to apply a negative voltage to the display pixel at the determined magnitude with a refresh rate of 30 Hz. Additionally, since a negative voltage is applied, the display pipeline 34 may decrement the counter 42 based on number of lines in the second image data 88. Thus, at t2, the counter value may be −1852.

As depicted, the display pipeline begins to receive third image data 90 at t2. To display a third image fame corresponding with the third image data 90, the display pipeline 34 may determine the magnitude of the voltage to apply based on the active lines included in the third image data 90. Additionally, in response to receiving the third image data 90, the display pipeline 34 may poll the counter 42 and determine that the previous counter value is −1852. Based on the previous counter value, the display pipeline 34 may determine that the third image frame should be displayed by applying a positive voltage should be applied to the display pixel. Furthermore, the display pipeline 34 may determine that the third image data 90 includes 52 vertical blank lines and 1800 active lines (e.g., 1852 total lines) and, thus, the third image frame should be displayed with a refresh rate of 60 Hz.

Accordingly, to display the third image frame, the display pipeline 34 may instruct the display driver 36 to use a positive voltage to the display pixel at the determined magnitude with a refresh rate of 60 Hz. Additionally, since a positive voltage is applied, the display pipeline may increment the counter 42 based on number of lines in the third image data 90. Thus, at t3, the counter value may be zero.

As depicted, the display pipeline begins to receive fourth image data 92 at t3. To display a fourth image corresponding with the fourth image data 92, the display pipeline 34 may determine the magnitude of the voltage to apply based on the active lines included in the fourth image data 92. Additionally, in response to receiving the fourth image data 92, the display pipeline 34 may poll the counter 42 and determine that the previous counter value is zero. Based on the previous counter value, the display pipeline 34 may determine that the fourth image frame should be display by applying a positive voltage to the display pixel.

As such, third image frame and the fourth image frame are applied by applying the same voltage polarities to the display pixels. In other words, the voltages applied using the present techniques do not necessarily alternate in successive images. However, in some instances, applying the same voltage polarity to successively display image frames may result in a perceivable luminance spike. As will be described in more detail below, to reduce likelihood of a perceivable luminance spike, the display pipeline 34 may apply an inversion balancing grayscale offset to the fourth image data 92.

Furthermore, the display pipeline 34 may determine that the fourth image data 92 includes 978 vertical blank lines and 1800 active lines (e.g., 2778 total lines) and, thus, the fourth image frame should be displayed with a 45 Hz refresh rate. In other words, in some embodiments, the refresh rate is not limited to 30 Hz and 60 Hz and can be any refresh rate suitable for the electronic display 12. In fact, in some embodiments, the refresh rate may be anywhere from 0.2-75 Hz.

To display the fourth image frame, the display pipeline 34 may instruct the display driver 36 to apply a positive voltage to the display pixel at the determined magnitude with a refresh rate of 45 Hz. Additionally, since a positive voltage is applied, the display pipeline 34 may increment the counter 42 based on number of lines in the fourth image data 92. Thus, at t4, the counter value may be 2778.

As depicted, the display pipeline 34 begins to receive fifth image data 94 at t4. To display a fifth image corresponding with the fifth image data 94, the display pipeline 34 may determine the magnitude of the voltage to apply based on the active lines included in the fifth image data 94. Additionally, in response to receiving the fifth image data 94, the display pipeline 34 may poll the counter 42 and determine that the previous counter value is 2778. Based on the previous counter value, the display pipeline 34 may determine that the fifth image frame should be displayed by applying a negative voltage to the display pixel. Furthermore, the display pipeline 34 may determine that the fifth image data 94 includes 52 vertical blank lines and 1800 active lines (e.g., 1852 total lines) and, thus, the fifth image should be displayed with a 60 Hz refresh rate.

Accordingly, to display the fifth image frame, the display pipeline 34 may instruct the driver 36 to apply a negative voltage to the display pixel at the determined magnitude with a refresh rate of 60 Hz. Additionally, since a negative voltage is applied, the display pipeline 34 will increment the counter 42 based on number of lines in the fifth image data 94. Thus, at t5, the counter value may be 926.

At t5, the display pipeline 34 may cease receiving image data from the image source 35, which may indicate that the image source 35 is asleep. As such, the electronic display 12 may continue displaying the fifth image frame and, thus, continue holding the negative voltage to the display pixel. Thus, in response to detecting that new image data is not received, the display pipeline 34 may start the timer 41 at t5.

As depicted, the display pipeline 34 begins to receive sixth image data 96 at t6, which may indicate that the image source 35 is no longer asleep. Thus, in response to detecting that a new image has been received, the display pipeline 34 may stop the timer 41 at t6. As described above, the display pipeline 34 may update the counter 42 based at least in part on the timer value. For example, the display pipeline 34 may determine equivalent number of lines the fifth image frame is displayed while the image source 35 is asleep by dividing the timer value by time generally used to write a line of an image frame. For example, assuming that it generally takes 1 ms to write one line of an image frame and the timer value at t6 is 2222, the display pipeline 34 may determine that between t5 and t6 a negative voltage is held in the display panel pixels for 2222 lines. Additionally, since a negative voltage is applied, the display pipeline 34 may decrement the counter 42 based on the equivalent number of lines. Thus, the counter value at t6 may be −1296.

To display a sixth image corresponding with the sixth image data 96, the display pipeline 34 may determine the magnitude of the voltage to apply based on the active lines included in the sixth image data 96. Furthermore, in response to receiving the sixth image data 96, the display pipeline 34 may poll the counter 42 and determine that the previous counter value is −1296. Thus, the display pipeline 34 may determine that the sixth image frame should be displayed by applying a positive voltage should be applied to the display pixel. Furthermore, the display pipeline 34 may determine that the sixth image data 96 includes 1904 vertical blank lines and 1800 active lines (e.g., 3704 total lines) and, thus, the sixth image should be displayed with a refresh rate of 30 Hz.

Accordingly, to display the sixth image frame, the display pipeline 34 may instruct the display driver 36 to apply a positive voltage to the display pixel at the determined magnitude with a refresh rate of 30 Hz. Additionally, since a positive voltage is applied, the display pipeline 34 may increment the counter 42 based on number of lines in the sixth image data 96. Thus, at t7, the counter value may be 2408.

As depicted, the display pipeline 34 begins to receive seventh image data 98 at t7. To display a seventh image corresponding with the seventh image data 98, the display pipeline 34 may determine the magnitude of the voltage to apply based on the active lines included in the seventh image data 98. Furthermore, in response to receiving the seventh image data 98, the display pipeline 34 may poll the counter 42 and determine that the previous counter value is 2408. Thus, the display pipeline 34 may determine that the seventh image frame should be displayed by applying a negative voltage to the display pixel. Furthermore, the display pipeline 34 may determine that the seventh image data 98 includes 1375 vertical blank lines and 1800 active lines (e.g., 3175 total lines) and, thus, the seventh image frame should be displayed with a refresh rate of 35 Hz.

Accordingly, to display the seventh image frame, the display pipeline 34 may instruct the display driver 36 to apply a negative voltage to the display pixel at the determined magnitude with a refresh rate of 35 Hz. Additionally, since a negative voltage is applied, the display pipeline 34 may decrement the counter 42 based on number of lines in the seventh image data 98. Thus, at t8, the counter value may be −767.

As depicted, the display pipeline 34 begins to receive eighth image data 100 at t8. To display an eighth image corresponding with the eighth image data 100, the display pipeline 34 may determine the magnitude of the voltage to apply based on the active lines included in the eighth image data 100. Furthermore, in response to receiving the eighth image data 100, the display pipeline 34 may poll the counter 42 and determine that the previous counter value is −767. Thus, the display pipeline 34 may determine that the eighth image frame should be displayed by applying a positive voltage to the display pixel. Furthermore, the display pipeline 34 may determine that the eighth image data 100 includes 52 vertical blank lines and 1800 active lines (e.g., 1852 total lines) and, thus, the eighth image frame should be displayed with a refresh rate of 60 Hz.

Accordingly, to display the eight image frame, the display pipeline 34 may instruct the display driver 36 to apply a positive voltage to the display pixel at the determined magnitude with a refresh rate of 60 Hz. Additionally, since a positive voltage is applied, the display pipeline 34 may increment the counter 42 based on number of lines in the eighth image data 100. Thus, at t9, the counter value may be 1085.

In this manner, the positive voltages and negative voltages may be applied for similar durations, thereby reducing polarization of the display pixels and likelihood of perceivable visual artifacts. Additionally, in the above described example, the display pipeline 34 determines voltage polarities assuming a linear relationship between duration a voltage and amount of polarization. In other words, a positive voltage applied for one line should exactly cancel out a negative voltage applied for one line. However, in other embodiments, the relationship may be non-linear. To implement a non-linear embodiment, the amount the counter 42 counts up or down may be adjusted. For example, the longer a voltage is applied/held the less the counter 42 may count up or down. In other words, a non-linear counter may be used.

Figure 10:
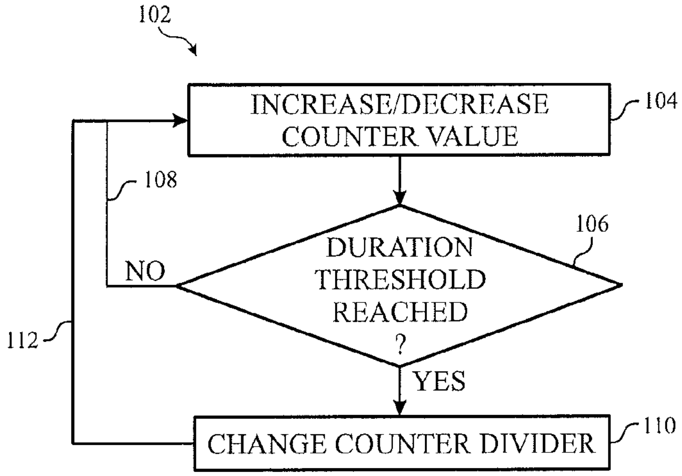
FIG. 10 is a flow diagram of a process for updating the counter value non-linearly, in accordance with an embodiment.

To help illustrate, one embodiment of a process 102 for using a non-linear counter 42 is described in FIG. 10. Generally, the process 102 includes increasing/decreasing the counter value (process block 104), determining whether the counter value has reached a duration threshold (decision block 106), and, when the duration threshold has not been reached, continuing the increase/decrease the counter (arrow 108). On the other hand, when the duration threshold is reached, the process 102 includes changing the counter divider (process block 110) and returning to increasing/decreasing the counter (arrow 112). In some embodiments, the process 102 may be implemented using instructions stored in a tangible, non-transitory, computer-readable medium, such as the controller memory 47, executable by processing circuitry, such as the controller processor 46.

As in the linear embodiments described above, the display pipeline 34 may update (e.g., increment or decrement) the counter value based on the duration an image frame is displayed (process block 104). However, once the display pipeline 34 determines that duration the image frame has been displayed reaches a duration threshold (decision block 106), the display pipeline may adjust a counter divider value may be applied (process block 110). In some embodiments, a counter divider may be applied so that the counter value adjusts at smaller increments. For example, a counter divider value of two may be applied once a duration threshold is reached. In such an embodiment, the counter 42 may be adjusted one unit for every two lines.

To help illustrate, an example of a duration threshold versus counter divider relationship is described below.

TABLE 1

| Duration threshold vs. Counter Divider | |
|---|---|
| Duration threshold | Counter Divider |
| 1852 | 2 |
| 3704 | 3 |
| 5556 | 4 |
| 7408 | 5 |
| 9260 | 6 |

In the described example, the duration thresholds and the counter dividers are set in a monotonically increasing fashion. However, in other embodiments, the duration threshold and the counter dividers may be set in any suitable manner. Furthermore, in other embodiments, additionally duration thresholds and counter dividers may be used.

Figure 11:
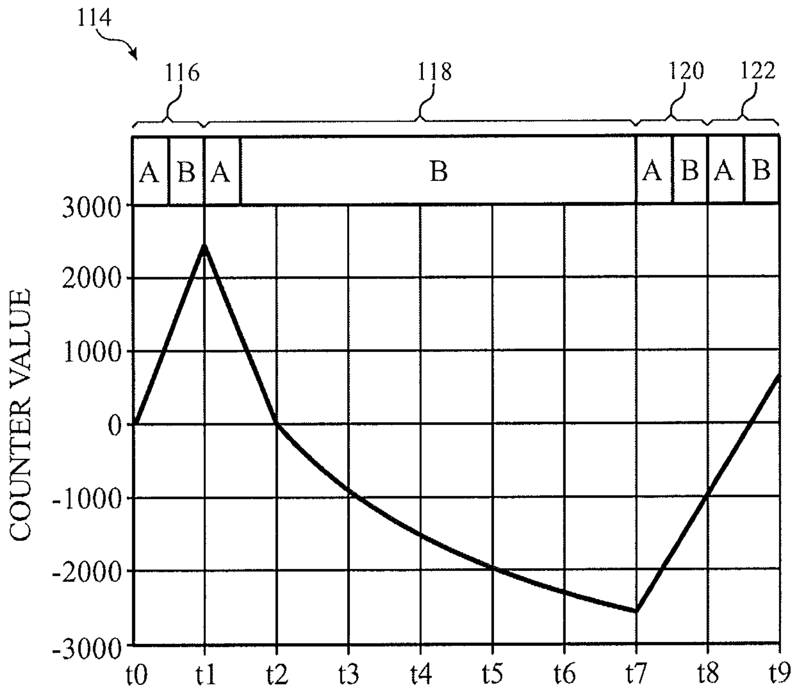
FIG. 11 is an example of a non-linear counter value in relation to a hypothetical operation of an electronic display, in accordance with an embodiment.

To help illustrate, a hypothetical display operation 114 is described in FIG. 11. In the depicted embodiment, image data received by the display pipeline 34 and corresponding value of the counter 42 are described between t0 and t9.

As depicted, the display pipeline 34 begins to receive first image data 116 at t0. In response to receiving the first image data 116, the display pipeline 34 may poll the counter 42 and determine that the previous counter value is zero. Based on the previous counter value, the display pipeline 34 may determine that a first image frame corresponding with the first image data 116 should be displayed by applying a positive polarity voltage to a display pixel of the electronic display 12. Additionally, the display pipeline 34 may determine that the first image data includes 52 vertical blank lines and 1800 active lines (e.g., 1852 total lines). Since a positive voltage is, the display pipeline 34 may increment the counter 42 one unit per line in the first image data 116 until a first duration threshold (e.g., 1852) is reached. Thus, the counter value at t1 may be 1852.

As depicted, the display pipeline 34 begins to receive second image data 118 at t1. In response to receiving the second image data, the display pipeline 34 may poll the counter 42 and determine that the previous counter value is 1852. Accordingly, the display pipeline 34 may determine that a second image frame corresponding with the second image data 118 should be displayed by applying a negative voltage to the display pixel. Additionally, the display pipeline 34 may determine that the second image data 118 includes 9312 vertical blank lines and 1800 active lines (e.g., 11,112 total lines). Based on the duration threshold versus counter divider relationship described above, the duration thresholds may be reached. Since a negative voltage is applied, the display pipeline 34 may decrement the counter 42 may per line in the second image data 118 until a first duration threshold (e.g., 1852) is reached. Thus, at t2, the counter value may be zero.

At t2, since the first duration threshold has been reached, the display pipeline 34 may apply a counter divider of two. Since a negative voltage is applied, the display pipeline 34 may decrement the counter 42 one unit every two lines of the second image data 118 above the first duration threshold until a second duration threshold (e.g., 3704) is reached. Thus, at t3, the counter value may be −926.

At t3, since the second duration threshold has been reached, the display pipeline 34 may apply a counter divider of three. Since a negative voltage is applied, the display pipeline 34 may decrement the counter 42 one unit every three lines of the second image data 118 above the second duration threshold until the third duration threshold (e.g., 5556) is reached. Thus, at t4, the counter value may be −1543.

At t4, since the third duration threshold has been reached, the display pipeline 34 may apply a counter divider of four. Since a negative voltage is applied, the display pipeline 34 may decrement the counter 42 one unit every four lines of the second image data 118 above the third duration threshold until a fourth duration threshold (e.g., 7408) is reached. Thus, at t5, the counter value may be −2006.

At t5, since the fourth duration threshold is reached, the display pipeline 34 may apply a counter divider of five. Since a negative voltage is applied, the display pipeline 34 may decrement the counter 42 one unit every five lines of the second image data 118 above the fourth duration threshold until the fifth duration threshold (e.g., 9260) is reached. Thus, at t6, the counter value may be −2376.

At t6, since the fifth duration threshold is reached, the display pipeline 34 may apply a counter divider of. Since a negative voltage is applied, the display pipeline 34 may decrement the counter 42 one unit every six lines of the second image data 118 above the fifth duration threshold. Thus, at t7, the counter value may be −2684.

As depicted, the display pipeline 34 begins to receive third image data 120 at t7. In response to receiving the third image data 120, the display pipeline 34 may poll the counter 42 and determine that the previous counter value is −2684. Accordingly, the display pipeline 34 may determine that a third image frame corresponding with the third image data 120 should be displayed by applying a positive voltage to the display pixel. Additionally, the display pipeline 34 may determine that the third image data 120 includes 52 vertical blank lines and 1800 active lines (e.g., 1852 total lines). Since a positive voltage is applied, the display pipeline 34 may increment the counter one unit per line in the third image data 120 until a first duration threshold (e.g., 1852) is reached. Thus, at t8, the counter value at t8 may be −832.

As depicted, the display pipeline 34 begins to receive fourth image data 122 at t8. In response to receiving the third image data 120, the display pipeline 34 may poll the counter 42 and determine that the previous counter value is −832. Accordingly, the display pipeline 34 may determine that a fourth image frame corresponding with the fourth image data 122 should be displayed by applying a positive voltage to the display pixel. Additionally, the display pipeline 34 may determine that the fourth image data 122 includes 52 vertical blank lines and 1800 active lines (e.g., 1852 total lines). Since a positive voltage is applied, the display pipeline 34 may increment the counter one unit per line in the third image data 120 until a first duration threshold (e.g., 1852) is reached. Thus, at t9, the counter value at t8 may be 1020.

As such, second image frame and the third image frame are displayed by applying the same voltage polarities to the display pixels. However, as described above, applying the same voltage polarities to display successive image frames may result in a perceivable luminance spike. To reduce likelihood of perceivable a perceivable luminance spike, the display pipeline 34 may utilize the inversion balancing compensation block 39 to adjust grayscale value of the image data.

Figure 12:
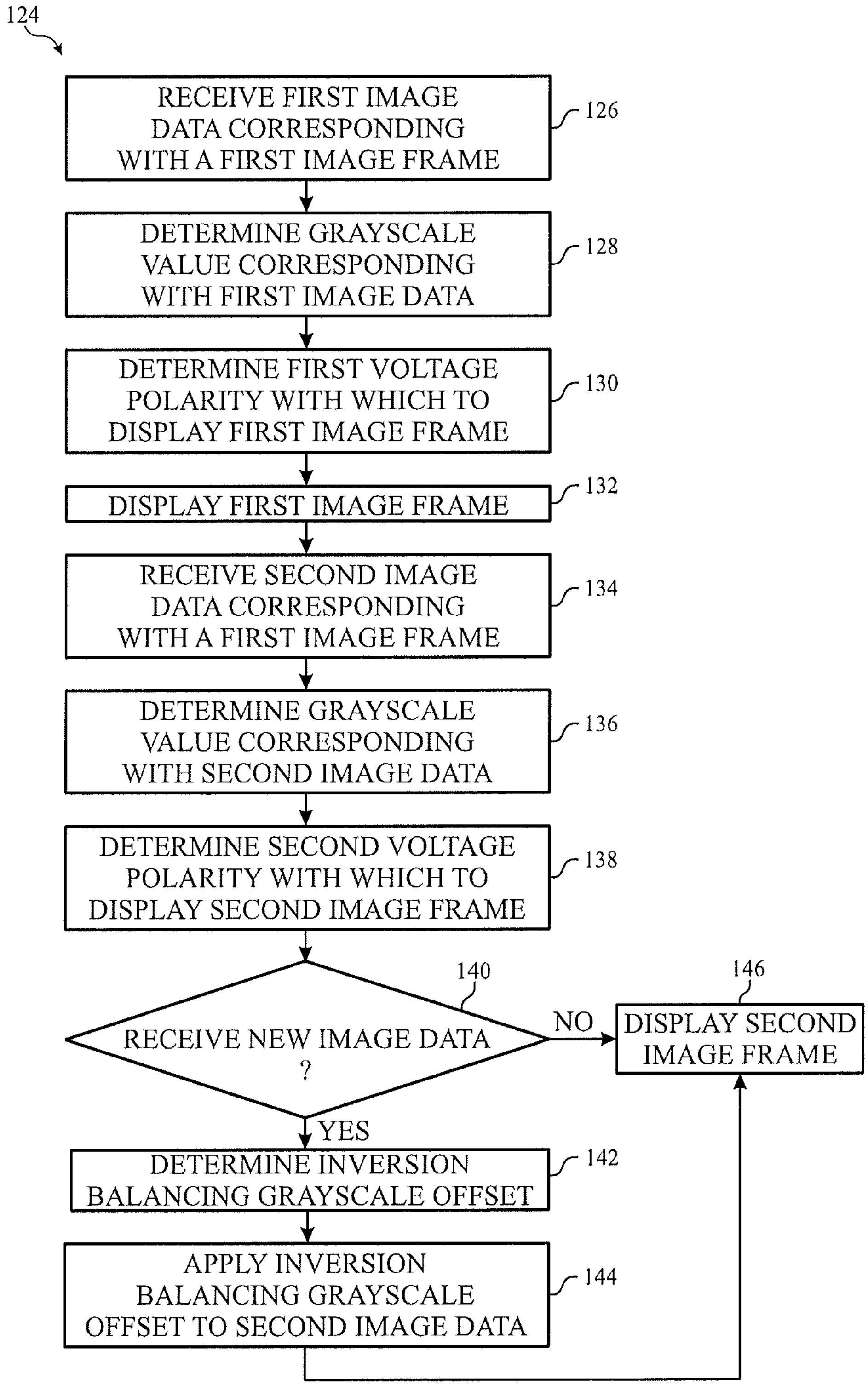
FIG. 12 is a flow diagram of a process for applying an inversion balancing gray scale offset to image data, in accordance with an embodiment.

To help illustrate, one embodiment of a process 124 for reducing likelihood of a luminance spike is described in FIG. 12. Generally, the process 124 includes receiving first image data corresponding with a first image frame (process block 126), determining a grayscale value corresponding with first image data (process block 128), determining a first voltage polarity with which to display the first image frame (process block 130), displaying the first image frame (process block 132), receiving second image data corresponding with a second image frame (process block 134), determining a grayscale value corresponding with the second image data (process block 136), determining second voltage polarity with which to display the second image frame (process block 138), and determining whether the voltage polarity is the same as voltage polarity used to display the first image frame (decision block 140). When the voltage polarities are the same, the process 124 includes determining an inversion balancing grayscale offset (process block 142), applying the inversion balancing grayscale offset to the second image data (process block 144), and displaying the second image frame (process block 146). In some embodiments, the process 124 may be implemented using instructions stored in a tangible, non-transitory, computer-readable medium, such as the controller memory 47, executable by processing circuitry, such as the controller processor 46.

Accordingly, in some embodiments, the controller 38 may instruct the image source 35 to output first image data corresponding with a first frame to the display pipeline 34 (process block 126). Once received, the controller 38 may instruct the display pipeline 34 to analyze and/or process the first image data. For example, the controller 38 may instruct the display pipeline 34 to analyze the first image data to determine number of lines (e.g., active and vertical blank lines) and, thus, expected display duration and refresh rate with which to display the first image frame.

Additionally, the controller 38 may instruct the display pipeline 34 to analyze the first image data to determine grayscale values corresponding with the first image data (process block 128). As used herein, a "grayscale value" is intended to describe luminance of a portion (e.g., a pixel) of an image frame. As described above, image data may include active lines that describe luminance of each pixel in a corresponding image frame. When received from the image source 35, the first image data may include the grayscale values in a linear domain. Thus, in such embodiments, the display pipeline 34 may determine linear domain grayscale values based at least in part on the first image data when initially received from the image source 35.

The controller 38 may also instruct the display pipeline 34 to process the first image data, for example, by determining and applying grayscale offsets to the first image data. In some embodiments, the grayscale offsets may adjust grayscale values of the first image data to facilitate displaying the first image frame such that it is perceived as desired. For example, temperature and/or backlight of the electronic display 12 may affect light emission from the display pixels and, thus, a user's perception of the first image frame. As such, the display pipeline 34 may determine and apply a temperature grayscale offset and/or a backlight grayscale offset to the first image data to compensate for light emission variations caused by temperature and/or backlight respectively.

Additionally, human eyes generally perceive luminance in a non-linear (e.g., gamma) domain. As such, the display pipeline 34 may use the pixel response correction (PRC) block 40 to determine pixel response grayscale offsets, for example, using one or more pixel response correction look-up-tables (LUTs) 45. In some embodiments, a pixel response correction look-up-table 45 may map a linear domain grayscale value to a pixel response grayscale offset. Thus, for each linear domain grayscale value, the pixel response correction block 40 may determine a corresponding pixel response grayscale offset, which when applied produces a gamma domain grayscale value. In this manner, the display pipeline 34 may determine gamma domain grayscale values corresponding with the first image data.

The controller 38 may also instruct the display pipeline 34 to determine polarities of first voltages applied to the display pixels to display the first image frame (process block 130). As described above, in some embodiments, the display pipeline 34 may determine the polarities with which to display an image frames based at least in part on value of the counter 42. For example, when the value is greater than or equal to zero, the display pipeline 34 may determine that the first image frame should be displayed by applying a positive voltage to a display pixel. On the other hand, when the value is less than zero, the display pipeline 34 may determine that the first image frame should be displayed by applying a negative voltage to the display pixel.

After the display pipeline 34 processes the first image data, the controller 38 may instruct the display driver 36 to display the first image frame (process block 132). As described above, in some embodiments, the display pipeline 34 may process the first image data by applying various grayscale offsets to adjust grayscale value, which indicates voltage magnitude to apply to the display pixels. Thus, based on the processed image data, the display driver 36 may apply voltages to the display pixels at the determined magnitude, polarity, and refresh rate to display the first image frame on the electronic display 12.

The controller 38 may also instruct the image source 35 to output second image data corresponding with a second frame to the display pipeline 34 (process block 134). Once received, the controller 38 may instruct the display pipeline 34 analyze and/or process the second image data. For example, the controller 38 may instruct the display pipeline 34 to analyze the second image data to determine number of lines (e.g., active and vertical blank lines) and, thus, expected display duration and refresh rate with which to display the second image frame.

Additionally, the controller 38 may instruct the display pipeline 34 to analyze the second image data to determine grayscale values corresponding with the second image data (process block 136). In some embodiments, the display pipeline 34 may determine the grayscale values based at least in part on active lines of the second image data. For example, the display pipeline 34 may determine linear domain grayscale values based at least in part on the second image data when initially received from the image source 35.

The controller 38 may also instruct the display pipeline 34 to process the second image data, for example, by determining and applying grayscale offsets to the second image data. In some embodiments, the display pipeline 34 may determine and apply a temperature grayscale offset and/or a backlight grayscale offset to the first image data to compensate for light emission variations caused by temperature and/or backlight respectively. Additionally, in some embodiments, the display pipeline 34 may use the pixel response correction block 40 to determine pixel response grayscale offsets to convert linear domain grayscale values to gamma domain grayscale values.

The controller 38 may also instruct the display pipeline 34 to determine polarities of second voltages to apply to the display pixels to display the second image frame (process block 138). In some embodiments, the display pipeline 34 may determine the polarities of the second voltages based at least in part on value of the counter 42. For example, when the value is greater than or equal to zero, the display pipeline 34 may determine that the second image frame should be displayed by applying a positive voltage to a display pixel. On the other hand, when the value is less than zero, the display pipeline 34 may determine that the first image frame should be displayed by applying a negative voltage to the display pixel.

Additionally, the controller 38 may instruct the display pipeline 34 to determine whether the polarities of the first voltages are the same as the polarities of the second voltages (decision block 140). In some embodiments, the controller 38 may compare voltage polarity applied to a display pixel to display the first image frame and voltage polarity to be applied to the same display pixel to display the second image frame. As described above, when the voltage polarity used to display successive image frames is the same, the later displayed image frame may contain a luminance spike.

To reduce likelihood of a perceivable luminance spike, the controller 38 may instruct the display pipeline 34 to determine inversion balancing grayscale offsets when the first voltage polarities and the second voltage polarities are the same (process block 142). In some embodiments, the display pipeline 34 may use the inversion balancing compensation (IBC) block 39 to determine the inversion balancing grayscale offsets based at least in part on both the grayscale values corresponding with the first image data and the grayscale values corresponding with the second image data, for example, using one or more inversion balancing compensation look-up-tables (LUTs) 44.

In some embodiments, an inversion balancing compensation look-up-table 44 describes maps grayscale value of a pixel in the first image data and grayscale value of the same pixel in the second image data to an inversion balancing grayscale offset. Additionally, in some embodiments, the inversion balancing compensation look-up-tables 44 may receive as inputs any combination of the linear domain grayscale values of the first image data, the gamma domain grayscale values of the first image data, the linear domain grayscale values of the second image data, and the gamma domain grayscale values of the second image data. In this manner, for each grayscale value of the second image data, the inversion balancing compensation block 39 may determine an inversion balancing grayscale offset.

The controller 38 may then instruct the display pipeline 34 to apply the inversion balancing grayscale offsets to the second image data (process block 144). In some embodiments, the inversion balancing grayscale offsets may be applied to the second image data to adjust grayscale values. For example, the applying the inversion balancing grayscale offsets may reduce grayscale values of the second image data and, thus, magnitude of the second voltages used to display the second image frame to offset any luminance spikes that may occur.

After the display pipeline 34 processes the second image data, the controller 38 may instruct the display driver 36 to display the second image frame (process block 146). As described above, in some embodiments, the display pipeline 34 may process the second image data by applying various grayscale offsets to adjust grayscale value, which indicates voltage magnitude to apply to the display pixels. Thus, based on the processed image data, the display driver 36 may apply voltage to the display pixels at the determined magnitude, polarity, and refresh rate to display the second image frame on the electronic display 12.

In this manner, the display pipeline 34 may reduce likelihood of the second image frame being displayed with a perceivable visual artifact by applying inversion balancing grayscale offsets to the second image data. As described above, the inversion balancing grayscale offsets may be determined based on grayscale values of both the first image data and the second image data. Thus, in some embodiments, inversion balancing grayscale offsets may be determined for any two image frames successively displayed using the same voltage polarities. To facilitate, the frame buffer 43 may be used to store image data corresponding with previously displayed image frames.

Additionally, the inversion balancing grayscale offsets may vary between different pairs of grayscale values. Thus, determining inversion balancing offsets may utilize a large number of inversion balancing compensation look-up-tables 44. For example, when grayscale values range from 0-255, up to 65,536 different two-dimensional look-up-tables may be used to determine inversion balancing grayscale offsets. As can be appreciated, the frame buffer and the inversion balancing compensation look-up-tables 44 may consume memory space and/or physical space within the computing device 10.

Thus, in some embodiments, the display pipeline 34 may limit when successive image frames can be displayed using the same voltage polarities to reduce impact on memory and/or physical space. For example, the display pipeline 34 may limit the use of same voltage polarities to image frames that are the same (e.g., have the same grayscale values). In such embodiments, since grayscale values of the successively displayed image frames are the same, the use of the frame buffer 43 may be obviated, the inversion balancing compensation look-up-tables 44 may be one-dimensional look-up-tables, and/or the number of inversion balancing compensation look-up-tables 44 may be reduced.

Figure 13:
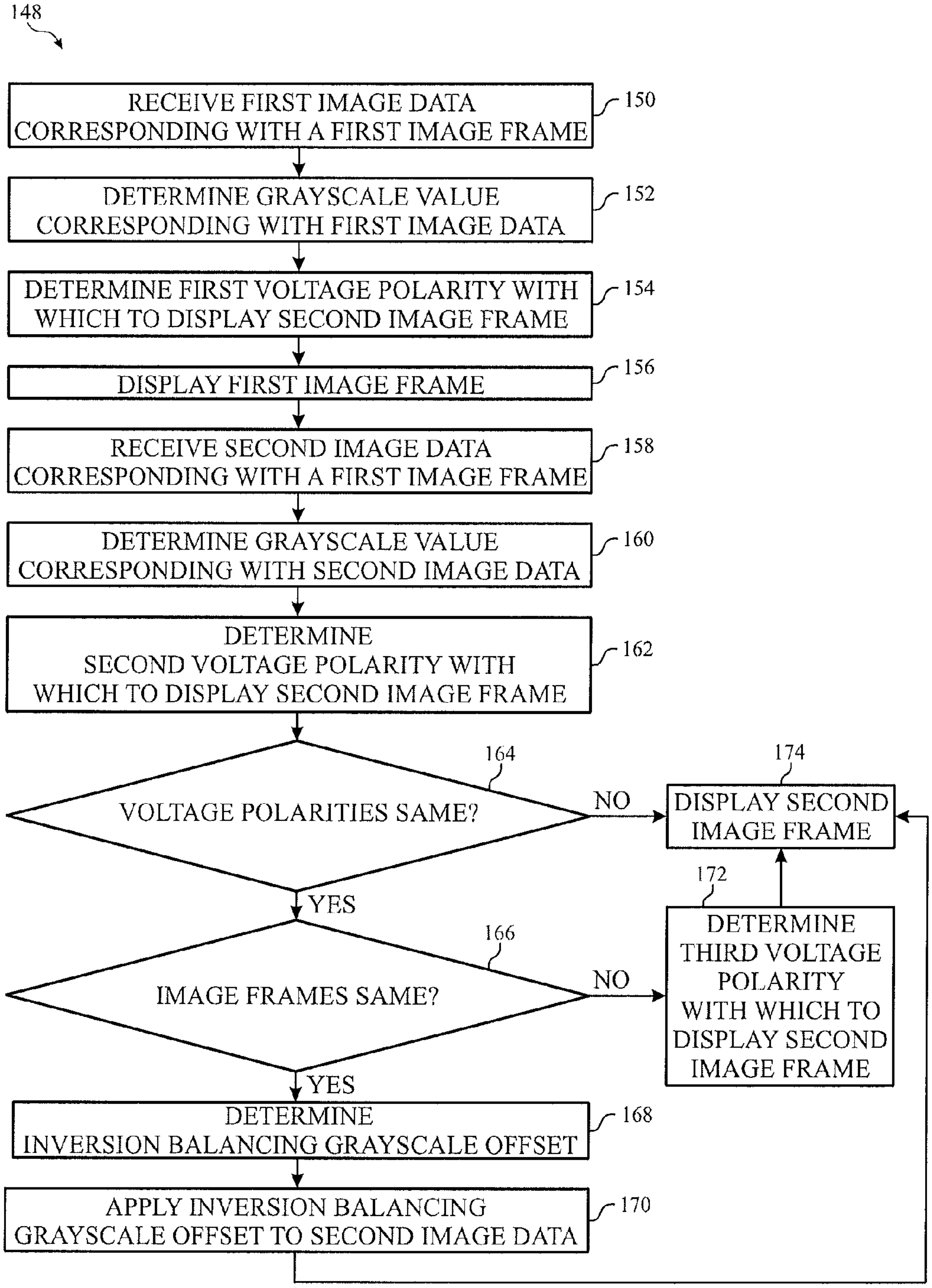
FIG. 13 is a flow diagram of another process for applying an inversion balancing grayscale offset to image data, in accordance with an embodiment.

To help illustrate, one embodiment of a process 148 for reducing likelihood of a luminance spike is described in FIG. 13. Generally, the process 124 includes receiving first image data corresponding with a first image frame (process block 150), determining a grayscale value corresponding with first image data (process block 152), determining first voltage polarity with which to display the first image frame (process block 154), displaying the first image frame (process block 156), receiving second image data corresponding with a second image frame (process block 158), determining a grayscale value corresponding with the second image data (process block 160), determining second voltage polarity with which to display the second image frame (process block 162), determining whether the first voltage polarity and the second voltage polarity are the same (decision block 166), and determining whether the first image frame and the second image frame are the same (decision block 168).

When the voltage polarities are the same and the image data is the same, the process 148 includes determining an inversion balancing grayscale offset (process block 170) and applying the inversion balancing grayscale offset to the second image data (process block 172). When the voltage polarities are the same and the image data is not the same, the process 148 includes determining a third voltage polarity with which to display the second image frame (process block 174). Furthermore, the process 148 includes displaying the second image frame (process block 176). In some embodiments, the process 148 may be implemented using instructions stored in a tangible, non-transitory, computer-readable medium, such as the controller memory 47, executable by processing circuitry, such as the controller processor 46.

Accordingly, similar to the process 124 described above, the controller 38 may instruct the image source 35 to output first image data corresponding with a first frame to the display pipeline 34 (process block 150), the display pipeline 34 to determine grayscale values corresponding with the first image data (process block 152), the display pipeline 34 to determine polarities of first voltages with which to display the first image frame (process block 154), and the display driver 36 to display the first image frame after the display pipeline 34 processes the first image data (process block 156). Additionally, similar to the process 124 described above, the controller 38 may instruct the image source 35 to output second image data corresponding with a second frame to the display pipeline 34 (process block 158), the display pipeline 34 to determine grayscale values corresponding with the second image data (process block 160), the display pipeline 34 to determine polarities of second voltages with which to display the second image frame (process block 162), and the display pipeline to determine whether the polarities of the first voltages are the same as polarities of the second voltages (decision block 164).

When the voltage polarities are the same, the controller 38 may instruct the display pipeline 34 to determine whether the first image frame and the second image data are the same (decision block 166). In some embodiments, the display pipeline 34 may receive an indication from the image source 35 that the first image frame and the second image frame are the same. For example, the image source 35 may indicate that the second image frame is a repeat of the first image frame. In such embodiments, since the display pipeline 34 may not directly compare the first image frame and the second image frame, the frame buffer 43 may be obviated.

As described above, when the voltage polarities used to display successive image frames are the same, the later displayed image frame may contain a luminance spike. Thus, when the voltage polarities are the same, but the image frames are different, the controller 38 may instruct the display pipeline 34 to determine third voltage polarities with which to display the same image frame (process block 172). In some embodiments, the display pipeline 34 may determine the third voltage polarities such that they are opposite the second voltage polarities and, thus, same as the first voltage polarities. As such, the third voltage polarities (e.g., first voltage polarities) may be used so that the second image frame and the first image frame are displayed with different voltage polarities, thereby reducing likelihood of the second image frame containing perceivable luminance spikes.

On the other hand, when the voltage polarities are the same and the image frames are the same, the controller 38 may instruct the display pipeline to determine inversion balancing grayscale offsets. Similar to the process 124 described above, the display pipeline 34 may use the inversion balancing compensation (IBC) block 39 to determine the inversion balancing grayscale offsets based at least in part on both the grayscale values corresponding with the first image data and the grayscale values corresponding with the second image data, for example, using one or more inversion balancing compensation look-up-tables (LUTs) 44. However, since the image frames are the same, inversion balancing compensation look-up-tables 44 may be one-dimensional look-up-tables.

As described above, the use of one-dimensional look-up-tables may facilitate reducing number of inversion balancing compensation look-up-tables 44. For example, when grayscale values range from 0-255, the inversion balancing compensation block 39 may utilize up to 256 one-dimensional look-up-tables. In this manner, limiting when successive image frames can be displayed with the same voltage polarities may facilitate reducing impact on memory and/or physical space within the computing device 10.

The controller 38 may then instruct the display pipeline 34 to apply the inversion balancing grayscale offsets to the second image data (process block 170). In some embodiments, the inversion balancing grayscale offsets may be applied to the second image data to adjust grayscale values. For example, the applying the inversion balancing grayscale offsets may reduce grayscale values of the second image data and, thus, magnitude of the second voltages used to display the second image frame to offset any luminance spikes that may occur.

After the display pipeline 34 processes the second image data, the controller 38 may then instruct the display driver 36 to display the second image frame (process block 174). As described above, in some embodiments, the display pipeline 34 may process the second image data by applying various grayscale offsets to adjust grayscale value, which indicates voltage magnitude to apply to the display pixels. Thus, based on the processed image data, the display driver 36 may apply voltage to the display pixels at the determined magnitude, polarity, and refresh rate to display the second image frame on the electronic display 12. In this manner, the display pipeline 34 may reduce likelihood of the second image frame being displayed with a perceivable visual artifact by applying inversion balancing grayscale offsets to the second image data.

Accordingly, the technical effects of the present disclosure include improving displayed image quality of an electronic display, for example, by reducing likelihood of displaying perceivable visual artifacts and/or perceivable luminance spikes. In some embodiments, a counter may be used to track polarization of display pixels based on duration positive polarity and negative polarity voltages have been applied to the display pixels. Thus, voltage polarities used to display subsequent image frames may be determined based at least in part on value of the counter to reduce polarization of the display pixels and, thus, likelihood of perceivable visual artifacts. To further improve image quality of successive image frames displayed using the same voltage polarities, an inversion balancing grayscale offset may be applied to image data of a later displayed image frame to reduce likelihood of displaying a perceivable luminance spike.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A computing device comprising:

an electronic display comprising a display pixel, wherein the electronic display is configured to display a first image frame by applying a first voltage to the display pixel and a second image frame directly before the first image frame by applying a second voltage to the display pixel; and a display pipeline communicatively coupled to the electronic display, wherein the display pipeline is configured to:

receive first image data corresponding with the first image frame from an image source, wherein the first image data comprises a first grayscale value corresponding with the display pixel;

determine an inversion balancing grayscale offset based at least in part on the first grayscale value when polarity of the first voltage and polarity of the second voltage are same; and determine magnitude of the first voltage by applying the inversion balancing grayscale offset to the first grayscale value to reduce likelihood of a perceivable luminance spike when displaying the first image frame.

2. The computing device of claim 1, wherein the display pipeline comprises an inversion balancing compensation block comprising a one-dimensional look-up-table, wherein the inversion balancing compensation block is configured to determine the inversion balancing grayscale offset based only on the first grayscale value when the first image frame and the second image frame are same.

3. The computing device of claim 1, wherein the display pipeline is configured to:

determine whether the first image frame and the second image frame are same; and determine the inversion balancing grayscale offset only when the first image frame and the second image frame are the same.

4. The computing device of claim 1, wherein the display pipeline comprises a counter configured to track duration positive voltages and negative voltages are applied to the display pixel, wherein the counter is configured to:

increase value of the counter based at least in part on duration the positive voltages are applied to the display pixel; and decrease the value of the counter based at least in part on duration the negative voltages are applied to the display pixel.

5. The computing device of claim 4, wherein the display pipeline is configured to:

receive second image data corresponding with the second image frame from the image source, wherein the second image data comprises active lines and vertical blank lines;

determine the polarity of the first voltage;

determine duration the first voltage is applied to the display pixel based at least in part on number of the active lines and the vertical blank lines;

update the value of the counter based at least in part on the duration the first voltage is applied;

determine that the polarity of the first voltage is negative when the value of the counter is greater than or equal to zero; and determine that the polarity of the first voltage is positive when the value of the counter is less than zero.

6. The computing device of claim 1, wherein the display pipeline is configured to:

determine the polarity of the second voltage such that the polarity of the second voltage is same as the polarity of the first voltage when the first image frame and the second image frame are same; and determine the polarity of the second voltage such that the polarity of the second voltage is opposite the polarity of the first voltage when the first image frame and the second image frame are different.

7. The computing device of claim 6, wherein the display pipeline is configured to determine that the first image frame and the second image frame are the same based on an indication from the image source that the second image frame is a repeat of the first image frame.

8. The computing device of claim 6, wherein the display pipeline comprises a frame buffer configured to store second image data corresponding with the second image frame;

wherein the display pipeline is configured to retrieve the second image data from the frame buffer and determine when the first image frame and the second image frame are the same by comparing grayscale values of the first image frame and grayscale values of the second image frame.

9. The computing device of claim 1, wherein the display pipeline is configured to:

determine second image data corresponding with the second image frame, wherein the second image data comprises a second grayscale value corresponding with the display pixel; and determine the inversion balancing grayscale offset based at least in part on the first grayscale value and the second grayscale value when the polarity of the first voltage and the polarity of the second voltage are same.

10. The computing device of claim 1, wherein the computing device comprises a portable phone, a media player, a personal data organizer, a handheld game platform, a tablet device, a computer, or any combination thereof.

11. A method comprising:

receiving, using an electronic display, first image data from an image source;

displaying, using the electronic display, a first image frame including by applying a first voltage to a display pixel of the electronic display based at least in part on the first image data;

receiving, using the electronic display, second image data from the image source;

determining, using a timing controller of the electronic display, polarity of a second voltage to be applied to the display pixel to display a second image frame based at least in part on duration the first image frame is displayed and polarity of the first voltage;

determining, using the timing controller, a magnitude of the second voltage based at least in part on the second image data and whether the polarity of the first voltage is same as the polarity of the second voltage; and displaying, using the electronic display, the second image frame directly after the first image frame including by applying the second voltage to the display pixel.

12. The method of claim 11, wherein determining the magnitude of the second voltage comprises:

determining an inversion balancing grayscale offset based at least in part on a first grayscale value and a second grayscale value corresponding with the display pixel, wherein the first image data comprises the first grayscale value and the second image data comprises the second grayscale value;

determining a third grayscale value based at least in part by applying the inversion balancing grayscale offset to the second grayscale value; and determining the magnitude of the second voltage based at least in part on the third grayscale value.

13. The method of claim 12, wherein determining the magnitude of the second voltage comprises:

determining a pixel response grayscale offset based at least in part on the second grayscale value, wherein the second grayscale value is in a linear domain; and determining the third grayscale value based at least in part by applying the pixel response grayscale offset to the second grayscale value, wherein the third grayscale value is in a gamma domain.

14. The method of claim 12, wherein determining the magnitude of the second voltage comprises determining the inversion balancing grayscale offset only when the first image frame and the second image frame comprise same grayscale values.

15. The method of claim 11, wherein determining the polarity of the second voltage comprises:

determining the polarity of the second voltage such that the polarity of the second voltage is the same as the polarity of the first voltage only when the first image frame and the second image frame are same; and determining the polarity of the second voltage such that the polarity of the second voltage is opposite the polarity of the first voltage when the first image frame and the second image frame are different.

16. The method of claim 11, wherein determining the magnitude of the second voltage comprises determining magnitude of the second voltage to reduce likelihood of displaying the second image frame with a perceivable luminance spike when the polarity of the first voltage and the polarity of the second voltage are the same.

17. The method of claim 11, wherein determine the polarity of the second voltage comprises determining the polarity of the second voltage based at least in part on polarization of the display pixel caused by display of the first image frame.

18. A tangible, non-transitory, computer-readable medium configured to store instructions executable by a processor of a computing device, wherein the instructions comprise instructions to:

determine, using the processor, polarity of a first voltage applied to a display pixel to display a first image frame;

updating, using the processor, value of a counter based at least in part on duration the first image frame is displayed;

determine, using the processor, polarity of a second voltage to apply to the display pixel to display a second image frame directly after the first image frame based at least in part on the value of the counter;

determine, using the processor, magnitude of the second voltage based at least in part on whether the polarity of the first voltage is same as the polarity of the second voltage; and instruct, using the processor, an electronic display to display the second image frame by applying the second voltage to the display pixel.

19. The computer readable medium of claim 18, wherein the instructions to determine the polarity of the second voltage comprise instructions to determine the polarity of the second voltage such that the polarity of the second voltage is only the same as the polarity of the first voltage when the first image frame and the second image frame are same.

20. The computer readable medium of claim 18, wherein the instructions to determine magnitude of the second voltage comprise instructions to:

determine an inversion balancing grayscale offset based at least in part on a first grayscale value and a second grayscale value corresponding with the display pixel, wherein the first image frame is displayed based at least in part on the first grayscale value and the second image frame is displayed based at least in part on the second grayscale value;

determine a third grayscale value based at least in part by applying the inversion balancing grayscale offset to the second grayscale value; and determine the magnitude of the second voltage based at least in part on the third grayscale value.

21. The computer readable medium of claim 18, wherein the instructions to update the value of the counter comprise instructions to:

determine number of lines including in image data corresponding with the first image frame, wherein the lines comprise active lines and vertical blank lines;

increment the value of the counter based on the number of lines when the polarity of the first voltage is positive; and decrement the value of the counter based on the number of lines when the polarity of the second voltage is negative.

22. The computer readable medium of claim 18, wherein the instructions to determine the polarity of the second voltage comprise instructions to:

determine the polarity of the second voltage is positive when:

the value of the counter is less than zero and the polarity of the first voltage is negative; or the value of the counter is greater than or equal to zero, the polarity of the first voltage is positive, and the first image frame and the second image frame are the same; and determine the polarity of the first voltage is negative when:

the value of the counter is greater than or equal to zero and the polarity of the first voltage is positive; or the value of the counter is less than zero, the polarity of the first voltage is negative, and the first image frame and the second image frame are the same.

23. An electronic display comprising:

a plurality of display pixels;

a timing controller configured to:

determine whether a first image frame to be written to the plurality of display pixels directly after a second image frame is same as the second image frame;

determine polarities of first voltages to use to write the first image frame to the plurality of display pixels based at least in part on polarities of second voltages used to write the second image frame to the plurality of pixels and duration the second image frame is displayed;

determine a plurality of inversion balancing grayscale offsets when the polarities of the first voltages is same as the polarities of the second voltages and the first image is the same as the second image frame; and determine magnitude of the first voltages based at least in part on the plurality of inversion balancing grayscale offsets; and a display driver configured to facilitate displaying the first image frame by applying the first voltages to the plurality of display pixels.

24. The electronic display of claim 23, wherein the timing controller is configured to:

determine the polarities of the second voltages based at least in part on polarization of the display pixels before the second image frame is displayed;

determine duration the second image frame is displayed based at least in part on number of lines included in image data corresponding with the second image frame;

update value of a counter based at least in part on the polarities of the second voltages and the duration the second image frame is displayed; and determine the polarities of the first voltages based at least in part on value of the counter.

25. The electronic display of claim 23, wherein the timing controller is configured to:

determine the polarities of the second voltages such that the polarities of the second voltage are the same as the polarities of the first voltages when the first image frame and the second image frame are same; and determine the polarities of the second voltages such that the polarities of the second voltages are opposite the polarities of the second voltages when the first image frame and the second image frame are different.

26. The electronic display of claim 23, wherein the timing controller is configured to determine that the first image frame and the second image frame are the same:

when the timing controller receives an indication from an image source that the first image frame is a repeat of the second image frame; or by comparing grayscale values of first image data corresponding with the first image frame and grayscale values of second image data corresponding with the second image frame.

27. The electronic display of claim 23, wherein the timing controller is configured to determine the plurality of inversion balancing grayscale offsets using one or more one-dimensional look-up-tables based at least in part on grayscale values included in image data corresponding with the second image frame.

* * * * *